(12) United States Patent
Bobb

(10) Patent No.: US 12,312,139 B2
(45) Date of Patent: May 27, 2025

(54) TAMPER EVIDENT BOTTLE FINISH AND CAP ASSEMBLY

(71) Applicant: Abdou Bobb, Baranowo (PL)

(72) Inventor: Abdou Bobb, Baranowo (PL)

( * ) Notice: Subject to any disclaimer, the term of this patent is extended or adjusted under 35 U.S.C. 154(b) by 305 days.

(21) Appl. No.: 18/098,082

(22) Filed: Jan. 17, 2023

(65) Prior Publication Data

US 2023/0227224 A1 Jul. 20, 2023

Related U.S. Application Data

(60) Provisional application No. 63/301,086, filed on Jan. 20, 2022.

(51) Int. Cl.
| | | |
|---|---|---|
| *B65D 55/02* | (2006.01) | |
| *B65D 1/02* | (2006.01) | |
| *B65D 41/34* | (2006.01) | |
| *B65D 50/04* | (2006.01) | |
| *B65D 51/18* | (2006.01) | |

(52) U.S. Cl.
CPC ......... *B65D 55/026* (2013.01); *B65D 1/0246* (2013.01); *B65D 41/34* (2013.01); *B65D 50/041* (2013.01); *B65D 51/18* (2013.01); *B65D 2251/0003* (2013.01)

(58) Field of Classification Search
CPC .... B65D 55/026; B65D 1/0246; B65D 41/34; B65D 50/041; B65D 51/18; B65D 39/08; B65D 50/061; B65D 41/30; B65D 41/0492
See application file for complete search history.

(56) References Cited

U.S. PATENT DOCUMENTS

| | | | | | |
|---|---|---|---|---|---|
| 3,873,001 | A | * | 3/1975 | Shulman | B65D 55/145 |
| | | | | | 215/206 |
| 3,926,325 | A | * | 12/1975 | Benson | B65D 50/061 |
| | | | | | 215/206 |
| 4,043,475 | A | * | 8/1977 | Wheeler | B65D 50/061 |
| | | | | | 215/256 |
| 4,281,771 | A | * | 8/1981 | Siegel | B65D 50/068 |
| | | | | | 215/220 |

(Continued)

*Primary Examiner* — Don M Anderson

(57) ABSTRACT

A bottle, or a generic container, for the tight storage of diverse materials, may comprise a circular lip at the top of its neck finish or opening with an inferiorly disposed smooth, slanted and curved outer surface that is punctuated by equally spaced indentations and that may extend outwards and stepwise downwards, first through a vertical and then a convex surface and finally to a smooth surface on which may be disposed a button protrusion. A tightly sealed finish may be characterized by its lip and the equally spaced protruding lugs disposed on its inner surface interacting tightly with threading and other parts of the inner part of a reusable aggregate cap which, in turn, may inextricably couple with an outer part on whose outer annular flange surface may be disposed a button marker protrusion that, because of inaccessible features and mechanisms on the cap units, may only align with the one on the outer surface of the finish or opening of an unopened bottle or container. Determination of whether a tightly capped container has been previously opened or tampered with, may quickly be performed, either visually or through touch, by checking the alignment, or not, of the externally exposed button protrusions.

5 Claims, 20 Drawing Sheets

(56) References Cited

U.S. PATENT DOCUMENTS

| | | | | |
|---|---|---|---|---|
| 4,469,233 | A * | 9/1984 | Wegscheid | B65D 55/02 |
| | | | | 215/230 |
| 5,520,296 | A * | 5/1996 | Freed | B65D 55/16 |
| | | | | 215/206 |
| 5,702,013 | A * | 12/1997 | Freed | A61J 7/04 |
| | | | | 215/206 |
| 10,604,306 | B2 * | 3/2020 | Sung | B65D 51/20 |
| D1,028,712 | S * | 5/2024 | Bobb | D9/434 |
| 2003/0209574 | A1 * | 11/2003 | Lin | B65D 47/248 |
| | | | | 222/548 |
| 2004/0195197 | A1 * | 10/2004 | Miceli | B65D 50/041 |
| | | | | 215/276 |
| 2006/0186081 | A1 * | 8/2006 | Reed | B65D 55/0818 |
| | | | | 215/230 |
| 2016/0167838 | A1 * | 6/2016 | Dong | B65D 41/0492 |
| | | | | 220/255 |
| 2017/0225843 | A1 * | 8/2017 | Glaser | B65D 55/02 |

\* cited by examiner

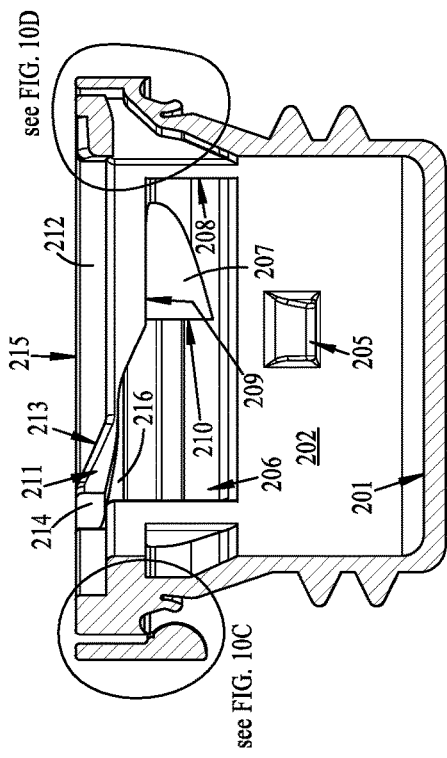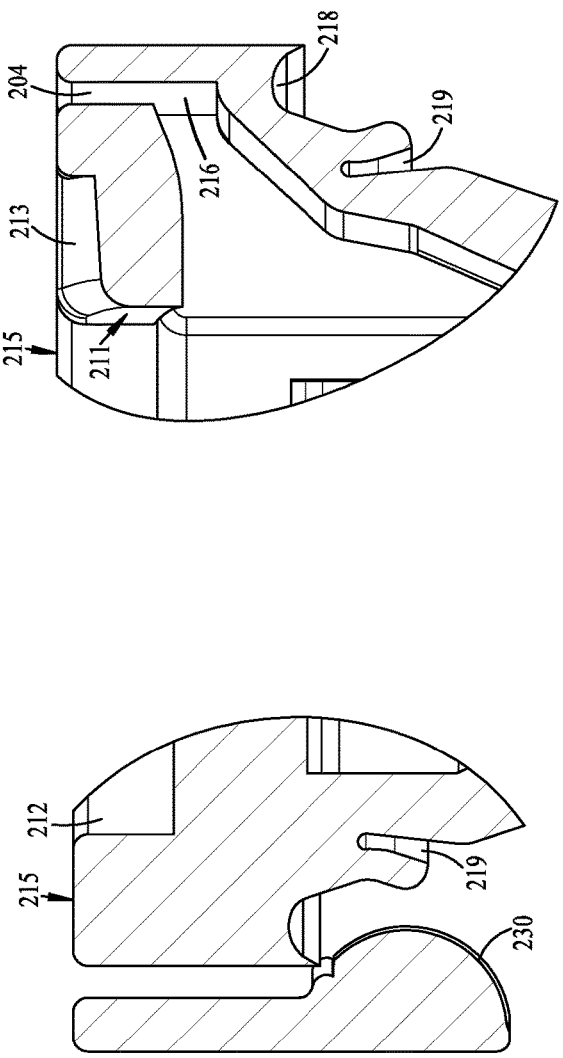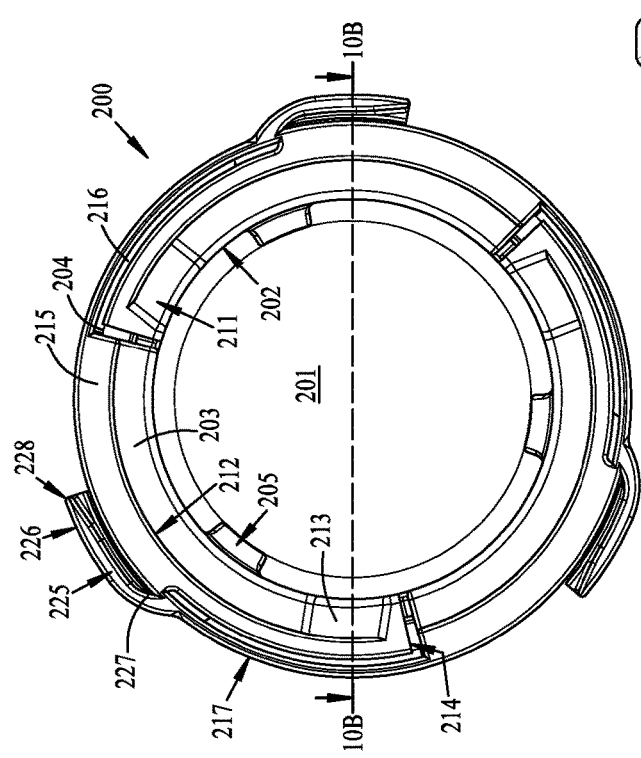

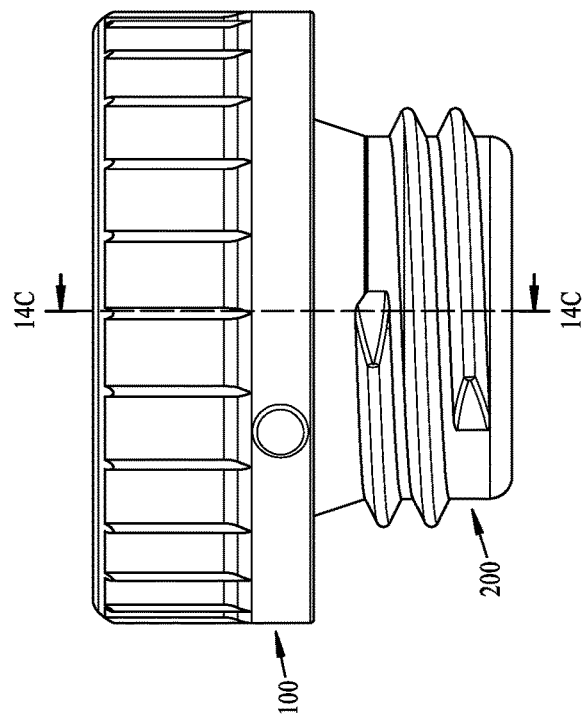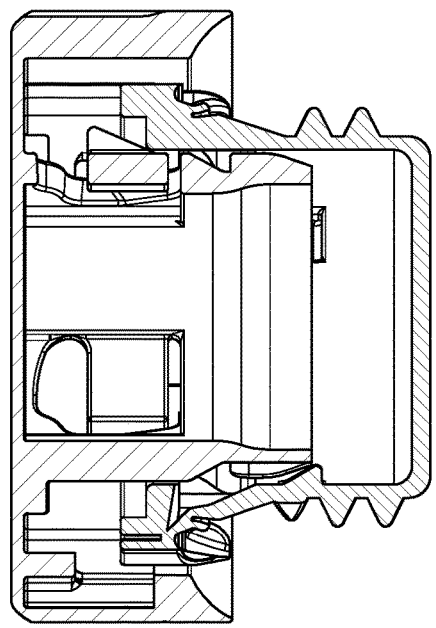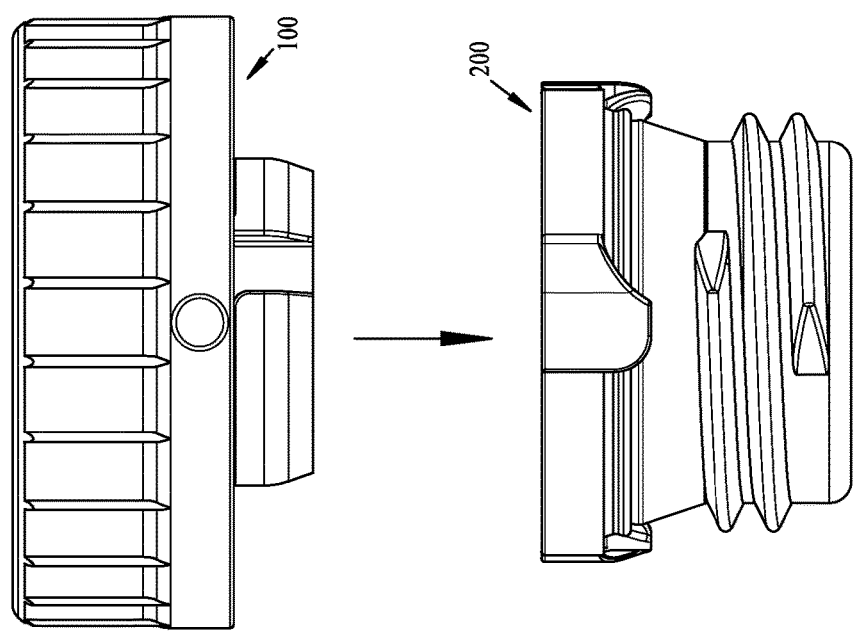
FIG. 14B
FIG. 14C
FIG. 14A

TAMPER EVIDENT BOTTLE FINISH AND CAP ASSEMBLY

BACKGROUND OF THE INVENTION

The present inventions relate generally to circular openings of containers, like bottles and jars, and the caps or lids that may cover them to tightly secure and preserve contents inside these containers. More particularly, it relates to bottle openings, which will be mostly referred to hereinbelow, and caps that are usually made of plastics like Polyethylene terephthalate, also known as PET. The bottles may be of glass, ceramics, plastics like PET or other suitable materials.

Although there have been bottles with threads on the inner surface of their openings, for example of the type by H. Frank, U.S. Pat. No. 130,208, most bottle openings nowadays may have male threads on or below their outer lip faces that may tightly interact with the female threads disposed on the inside surface of the annular flange of caps. Also, below the male threads on the openings may be disposed a collar or other protrusions on the neck of the bottle that enable the cap to also include a tamper resistant band disposed below its female threads. The band may connect to the flange of the cap through webs that get torn off whilst the bottle is being opened, thereby evidencing opening or tampering. This, although difficult to avoid, the very fact that it is possible means that protection against fraudulent opening cannot be guaranteed. These features on the outer surface of the openings may usually constrain the flexibility of the design of the overall shape, function and other aesthetic aspects of the bottle. Furthermore, the outside threads and the neck rings may render these surfaces not quickly inspected for unwanted deposits and, thus, may be the reason why it is neither hygienic or fashionable to drink straight from bottles. The thorough cleansing of the bottle that may precede its reuse may be easier without the exposed outside threading and neck collar on its opening that may also be susceptible to damage and deformities. The separation of bottle from the attached tamper band, that is also at times carelessly discarded, is a process that may render its recycling or reuse problematic. The absence of such a band may enhance the ability to recycle the bottle for a better environment.

The placing and tightening of caps with female threads on the relatively short flange surfaces into place on bottles may involve some fumbling, for the start of the threads on the cap and the finish to coincide, that many a time does lead to the cap falling to the ground where it may be contaminated. Increasing the height of the cap's flange may help in avoiding this, but does also mean the usage of more material in making the cap and the eventual lowering of the threads and collar on the bottle.

Also, many caps of bottles and lids of jars without tamper resistant mechanisms do employ plastic or paper sheet coverings on their exposed outer surfaces that must be discarded during first time opening. These discarded covers are usually not recycled and may be a source of irritation as refuse. Some tamper bands may continue to be attached to the caps and may either be irritants or provide surfaces for dirt to easily attach to when the caps are dropped or not properly handled. Therefore, their avoidance may enhance both cleaner environment, hygiene and general tidiness.

Also, both the initial factory quality and quantity of the content of some containers cannot be ascertained whilst they are on shop shelves because cursory inspection cannot determine whether the container has been previously opened or tampered with. At present caps on some containers may be wrapped or glued with etiquette labels that must be removed or torn apart, respectively, to access their contents.

The existing features described above suggest that there is a need for more effective solutions that may include a practically smooth and aesthetically pleasing bottle opening that may interact with an ergonomic cap that incorporates tamper resistance that is easily detectable.

BRIEF SUMMARY OF THE INVENTION

To address the limitations mentioned above and others issues with bottle openings and the caps that tightly store and prevent the leakage of their contents, the present invention may comprise a two-part cap, made of suitable plastic, with an inner unit that tightly fits the circular finish of a bottle or container that may have thread lugs, formed from a female thread, disposed inferiorly to the lip on its inner surface. Also, at least three equally spaced indentations may be disposed, inferiorly to the lip, on the outer surface of the neck finish, whilst on its otherwise smooth outermost surface may be disposed a button protrusion.

Assembling the aggregate cap may entail pushing its constituent parts into each other resulting in their relative displacements, except in only one rotational direction, being constrained. Screwing the assembled cap tightly on to the content filled bottle may lead to protrusions disposed on the insides of inner cap's equally spaced overhanging flaps snapping fully into the indentations on the outer surface of the bottle finish to constrain unscrewing anticlockwise rotation of the inner cap relative to the bottle. Simultaneously, the button protrusion on the outer surface of the outer cap part and that on the bottle finish may now be aligned to complete the capping of the bottle.

In this locked configuration, the only possible relative displacement may only be an anticlockwise rotation of the outer cap part relative to the coupled neck finish and inner cap part. Further inextricable coupling of the cap parts that precedes the eventual unscrewing of the cap from the neck finish may be achieved by this rotation and occurs in two steps.

First, the outer cap rotates to an intermediate position in which a locking mechanism is triggered that may prevent it from rotating back, in a clockwise manner, to its starting position whence the button protrusions on the neck finish and outer cap are aligned. Further rotation may result in the protrusions on the flaps of the inner cap being extracted from the recesses on the outer surface of the finish and the simultaneous constraining of all relative displacement between the cap parts and furthering the misalignment of the button protrusions on the outer cap part and finish surfaces. The tight sealing between the inner cap and bottle lip is still intact after this second step, but the cap parts are now coupled permanently to form an entity that can further be unscrewed from the bottle. The aggregate cap and bottle are now in an unlocked configuration.

Access to the contents of the bottle is now achieved by unscrewing the cap with the threads on the inner cap and the lugs on the neck finish now interacting. The bottle may be capped again with the now unscrewed aggregate cap but the button protrusions on the bottle opening and the outer cap will not align anymore. This misalignment indicating whether the bottled has been opened or tampered with may easily be done visually or through touching. The button protrusions indicating alignment or misalignment act only as markers, but other suitable shapes or proprietary logos may also be of use.

An additional aspect of the invention is that each feature on the aggregate cap and the bottle opening, except for the threads on the inner part of the cap and the lugs on the inside of the neck finish and the button protrusions on the outer cap part and on the outer surface of the finish, may repeat itself at least twice so that the centers of the adjacent features are equally spaced apart around a circular path.

Yet another aspect is a cap that may not have a tamper evident mechanism comprising of a frangible band that may wholly or partly detach from the cap after first-time opening. This mechanism is integrated in the inaccessible interactions between the cap parts and neck finish during first time opening.

Still another aspect is a bottle opening with a neck that may be smooth and whose shape may not be limited by the need of a protruding collar that, in many bottles, shields the tamper band from intrusion. This may enable greater flexibility in the overall aesthetic design of bottles.

Yet another aspect is that the inner part of the aggregate cap may be stably placed inside the bottle finish before any attempt at screwing and tightening. Thus, minors or people with grip difficulties may avoid fumbling the caps whilst trying to screw them on bottles.

Another aspect is that containers used for the storage of contents that are subject to periodic inspections may have openings that can be capped with the aggregate lid or caps of this invention to ascertain whether the contents have been accessed between such inspections.

BRIEF DESCRIPTION OF THE DRAWINGS

The appended drawings contain figures of exemplary embodiments to further illustrate and clarify the above and other aspects, advantages and features of the present inventions. It will be appreciated that these drawings depict only exemplary embodiments of the inventions and are not intended to be scope limiting. The inventions will hereinbelow be described and explained with the additional specificity and detail using the accompanying drawings in which:

FIG. 10A is an upper plan view of the inner part of the aggregate cap shown in FIG. 2. FIG. 10B is a cross-sectional plan view along the line 10B-10B shown in FIG. 10A. FIGS. 10C-10D are enlarged views of the details shown in FIG. 10B.

FIG. 14A-B are side views showing the inner and outer caps being put together to form the aggregate cap shown in FIG. 1. FIG. 14C is a cross-sectional plan view along the line 14C-14C shown in FIG. 14B.

DETAILED DESCRIPTION OF PREFERRED EMBODIMENTS

The present inventions are generally directed towards round openings of bottles, jars and containers and the caps that cover or close them to tightly store diverse items ranging from fluids such as water and carbonated fizzy drinks, creams, jams, sauces and other objects that may require storage in tightly sealed environments. The principles of the present inventions, however, are not limited to these storage requirements. It will be understood that, in light of the present disclosure of the different embodiments, many of the novel techniques described can be successfully used in connection with other types of openings and storage requirements. Preferred embodiments are provided in the following descriptions only as examples and modifications will be apparent to those skilled in the art. The general principles defined in the following descriptions would be applied to other embodiments, alternatives, equivalents, and applications without departing from the spirit and scope of the present inventions. Also, the descriptions that follow do not specify dimensions and relative positions of some features on the embodiments but they may be significant.

Additionally, to assist in the description of the exemplary embodiments of the cap parts and openings, words such as top, bottom, inner, outer, front, rear, right and left may be used to describe the accompanying figures which are drawn to different scales.

Figure 12:
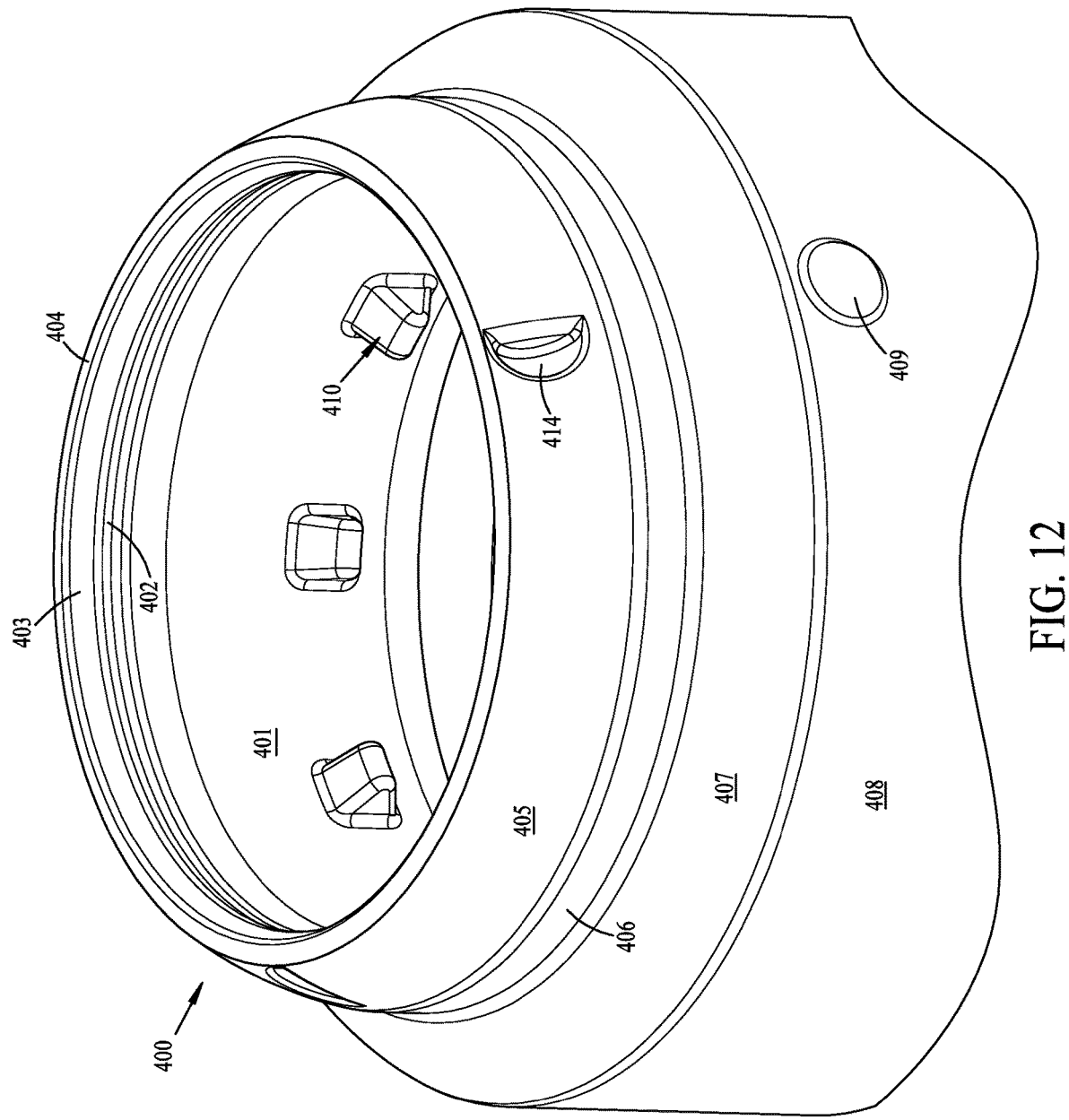
FIG. 12 is a partial upper perspective view of the neck finish, or opening part, of a bottle.
Figure 13B:
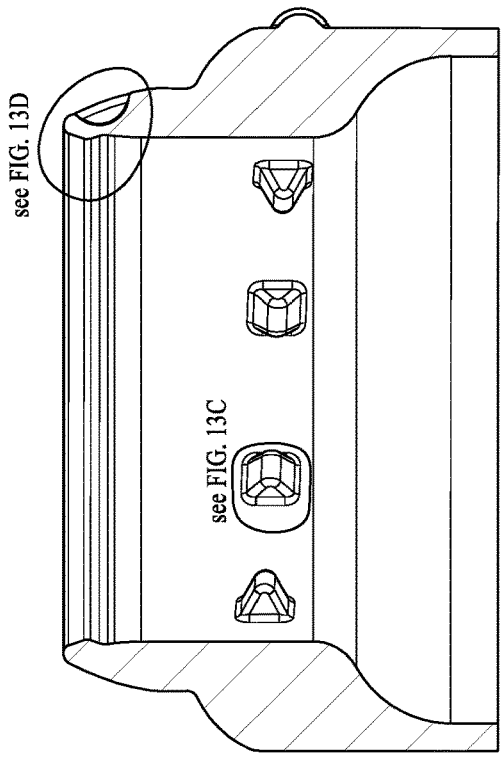
FIG. 13B is a cross-sectional plan view along the line 13B-13B shown in FIG. 13A.
Figure 13D:
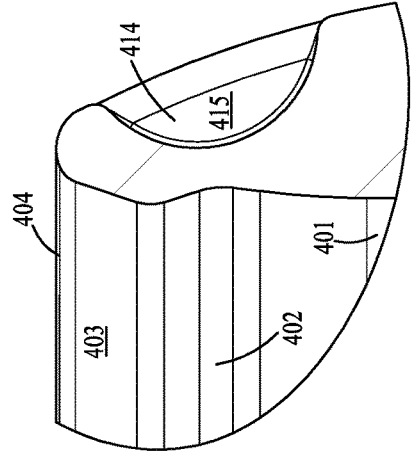
FIGS. 13C-13D are enlarged views of the details shown in FIG. 13B.
Figure 13C:
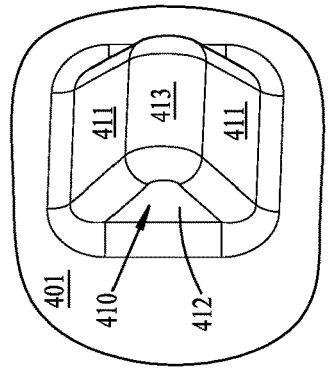
Figure 13A:
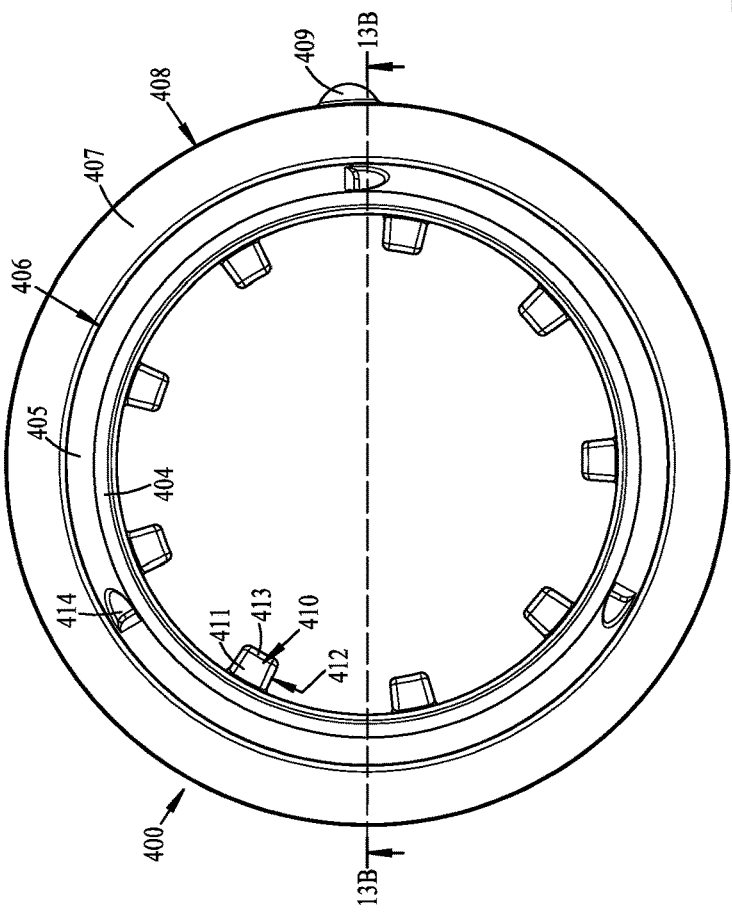
FIG. 13A is a top plan view of the neck finish shown in FIG. 12.

An embodiment of an opening or neck finish of a bottle 400 that is made of any suitable material, including metal, plastic, glass, and combinations thereof is shown in FIGS. 12, 13A. On the inside of the opening 400, the convex lip 404 extends downwards first to an inwards sloping smooth surface 403, then into an outwards curving recess 402 and finally to a smooth vertical surface 401 that is punctuated by wedge-shaped thread lugs 410, shown in FIG. 13C, with rounded edges 413 and planar faces 411, 412, that comprise the parts of a non-continuous clockwise and downward pointing screw thread spanning a revolution and are formed by the removal of segments of equal length. Cross-sectional shape of the inner surface inferior to the lip may help to prevent dripping during outpouring of content. The thread lugs 410 and their shape, instead of a full thread, may ease the outward flow of the bottle's content and hinder the unwanted attachment of substances. On the outer face of the opening 400, the lip 404 extends onto a downwards and outwards sloping slightly convex surface 405 that may be punctuated by three equally spaced identical indentations 414, as shown in FIGS. 13A-B. Abutting the downward sloping surface 405 may be a smooth vertical face 406 that in turn is abutted by another smooth sloping convex face 407 whose downward rounded edge is abutted by the outermost surface 408 of the opening 400. The neck finish 400 may thus have the normal relatively stiffer cross section than the rest of the bottle. On the outermost surface 408 may be disposed, at a cross-sectional position relative to the thread lugs 410 described hereinbelow, a spherical-shaped button protrusion 409. The indentations 414, shown in FIG. 13C, may be in the shape of a quadrant-sphere punch, with a subsequent concave surface and a vertical face 415 that is normal to the surface 405, whose edges are rounded to merge with the convex surface 405. The shape of the recess 414 and roundness of its edges may help in preventing accumulation of unwanted material.

Figure 1:
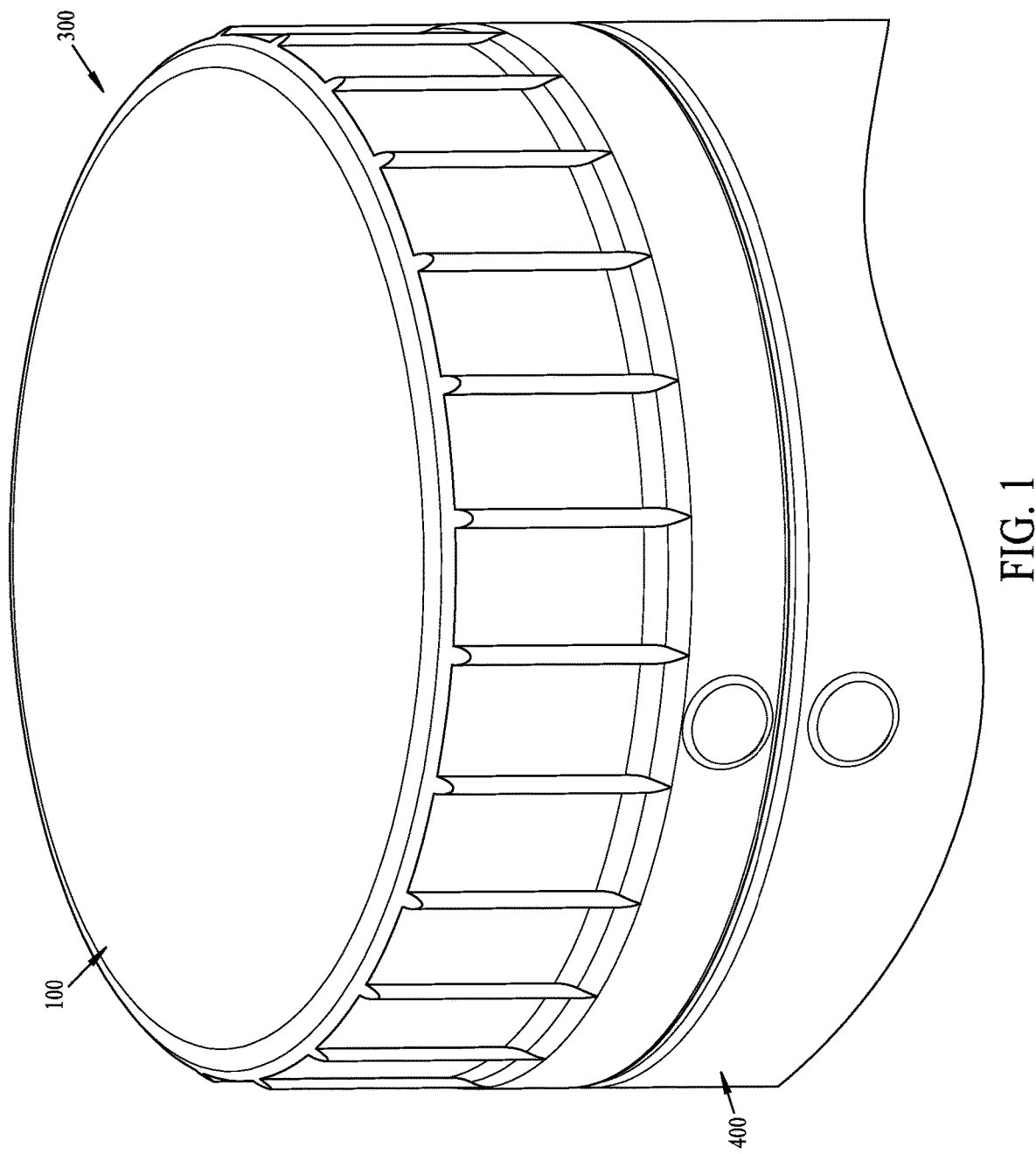
FIG. 1 is an upper perspective view of a neck finish of a bottle that is topped by a two-part aggregate cap in an unopened configuration.
Figure 2:
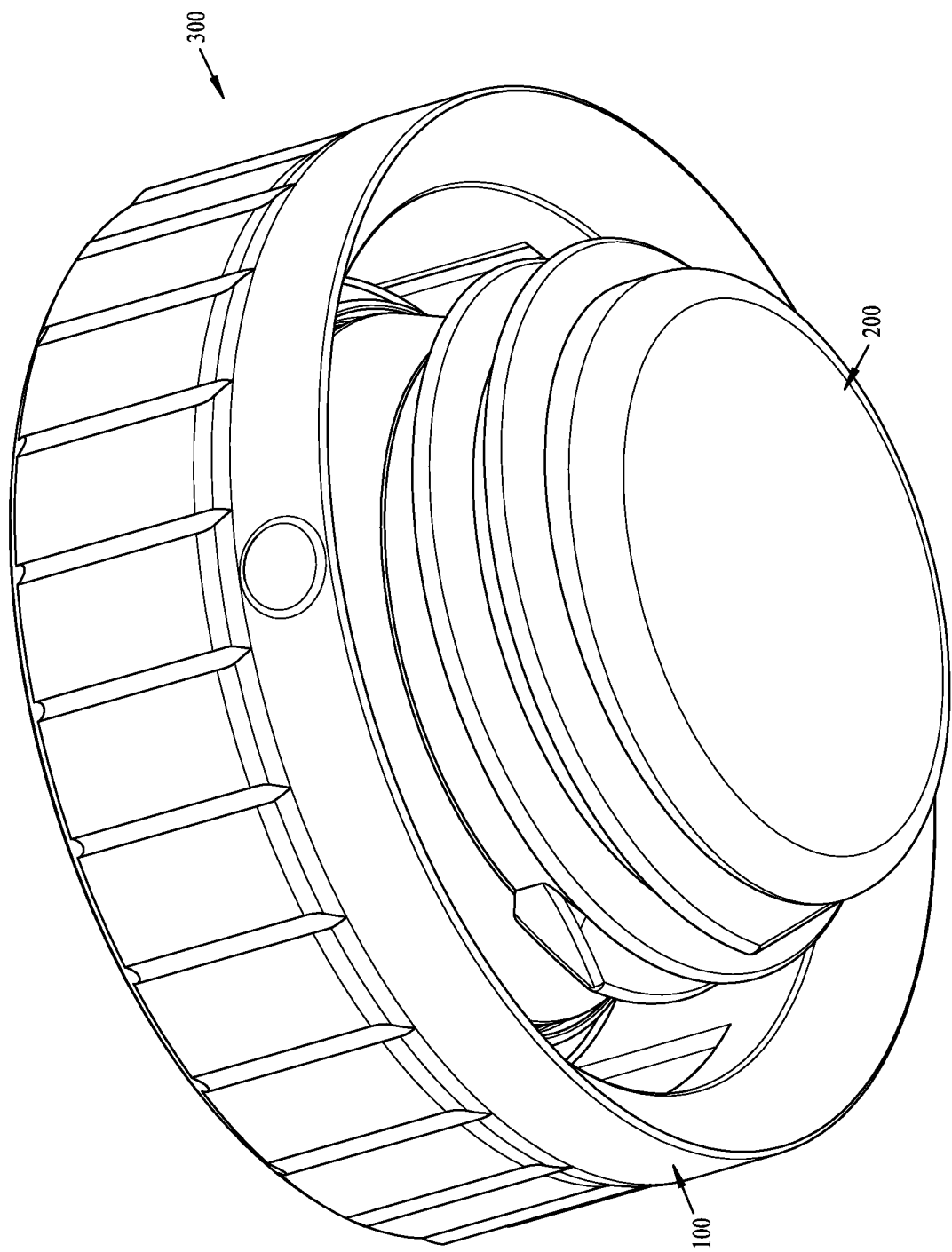
FIG. 2 is a lower perspective view of the aggregate cap shown in FIG. 1, in an opened and unscrewed configuration.
Figure 3:
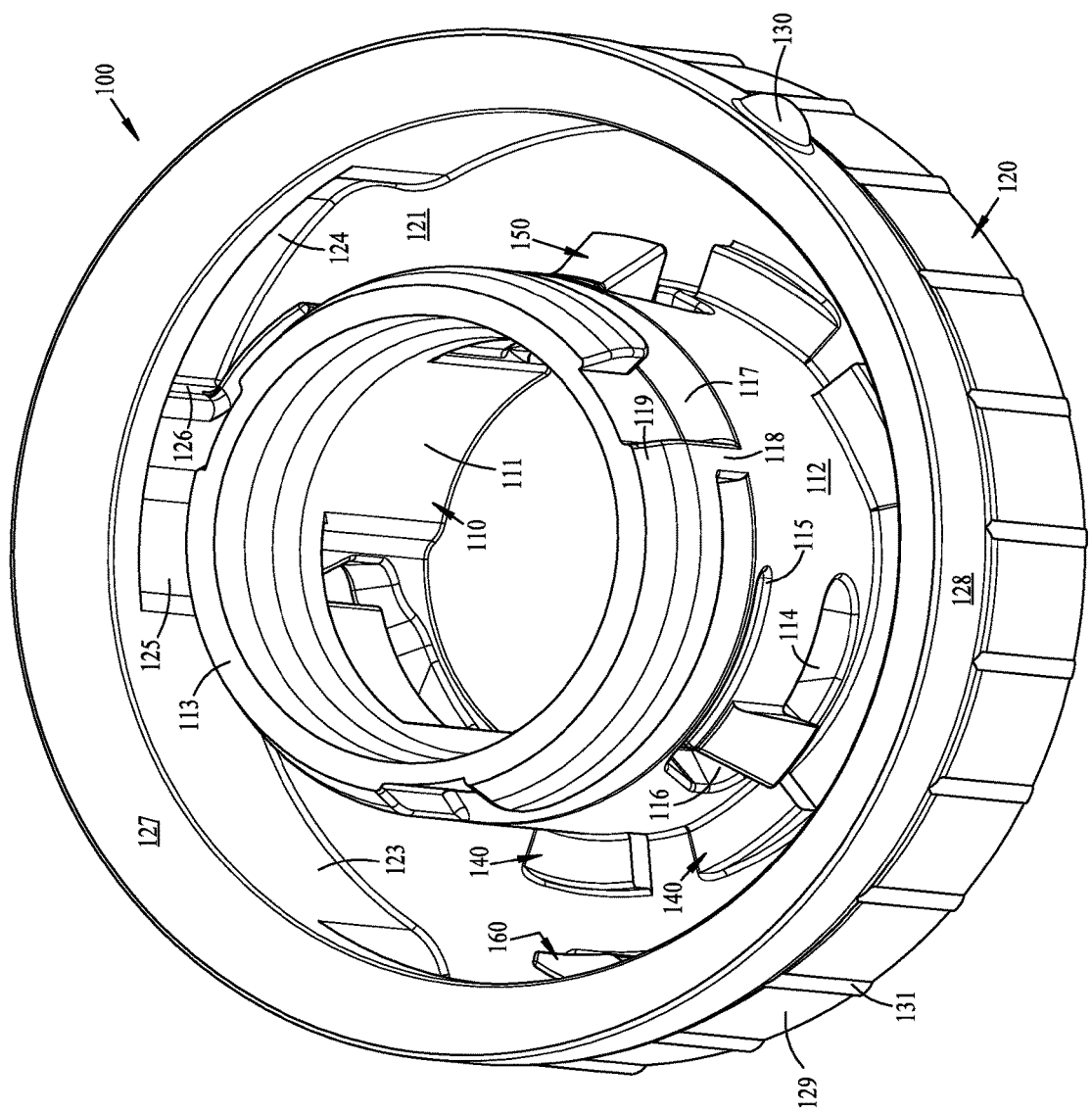
FIG. 3 is an upper perspective view, that also shows the inside, of the outer part of the aggregate cap shown in FIG. 2.
Figure 4:
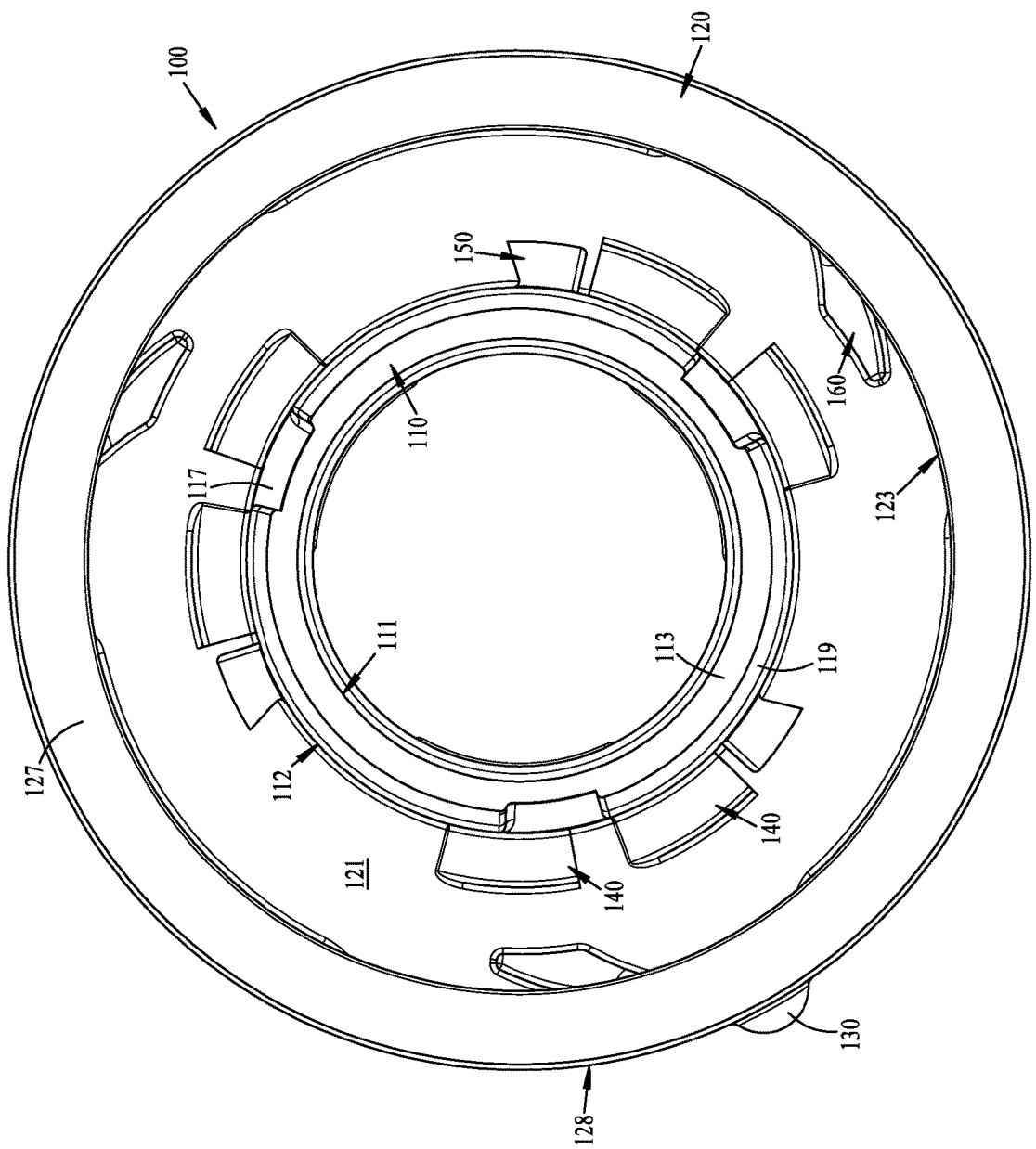
FIG. 4 is a plan view showing the inside of the outer part of the aggregate cap shown in FIG. 2.

An embodiment of an aggregate bottle cap 300, shown tightly capping the neck finish 400 FIG. 1, may comprise an inner part 200 and an outer part 100. To cause any relative displacement on a capped bottle between the cap 300 and the neck finish 400, the user may only interact with the outer part 100 whilst the inaccessible inner part 200 interacts with the opening 400 and seals it. The outer cap part 100 and its features, which, except for the button protrusion 130 disposed on its exterior, repeat twice in a circular direction and are spaced equidistant apart, are shown in FIGS. 3-7C. The details of the inner part 200, also with twice repeating features in a circular direction, except for the threading 222, are shown in FIGS. 8-11D.

Figure 5B:
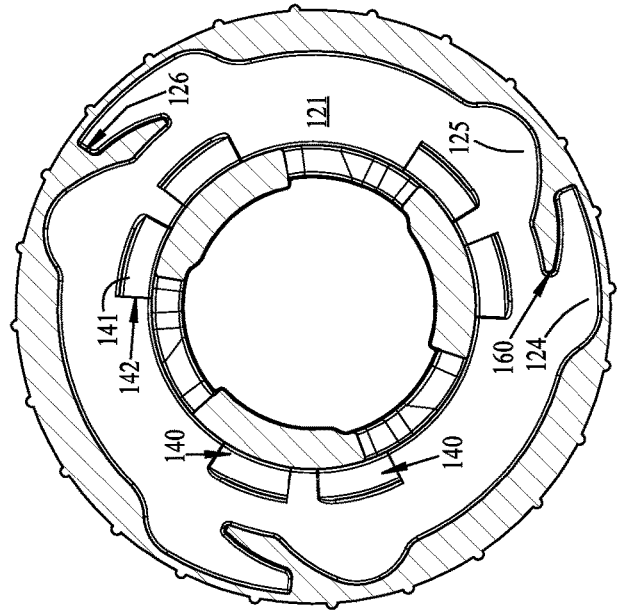
FIGS. 5B-5C are cross-sectional plan views along the lines 5B-5B and 5C-5C shown in FIG. 5A, respectively.
Figure 5D:
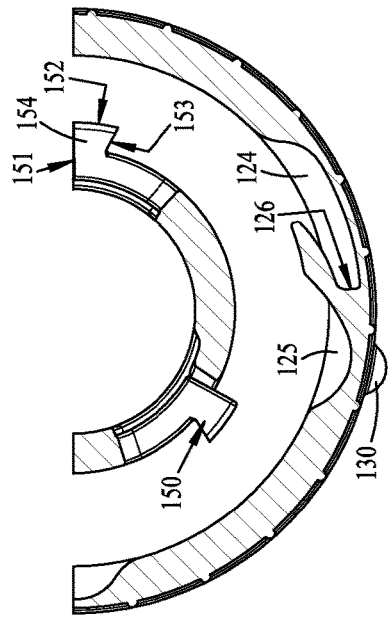
FIG. 5D is a cross-sectional plan view along the line 5D-5D shown in FIG. 5C.
Figure 5A:
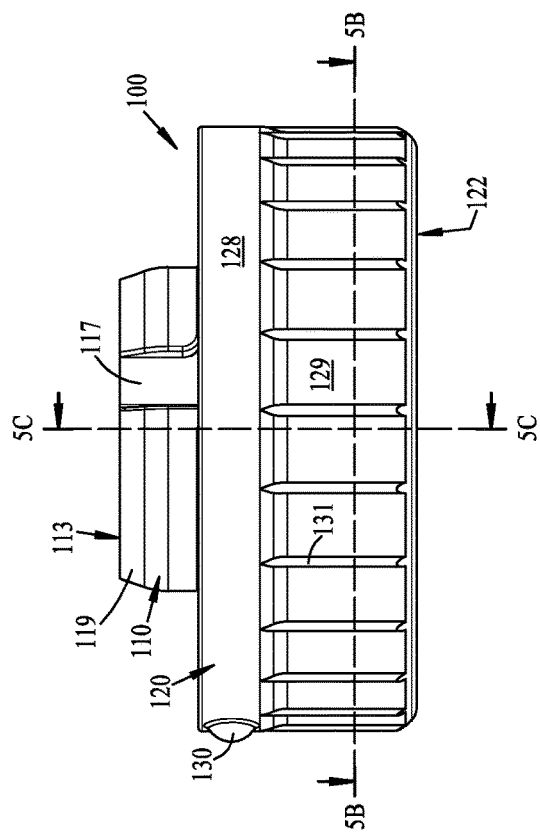
FIG. 5A is a side view of the outer part of the aggregate cap shown in FIG. 2.
Figure 5C:
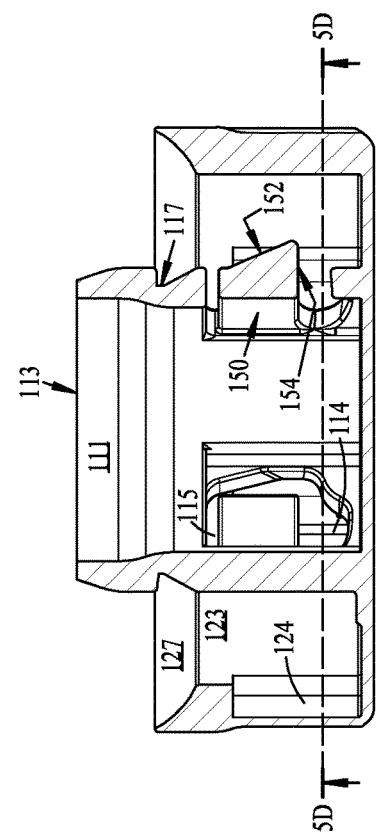
Figure 6D:
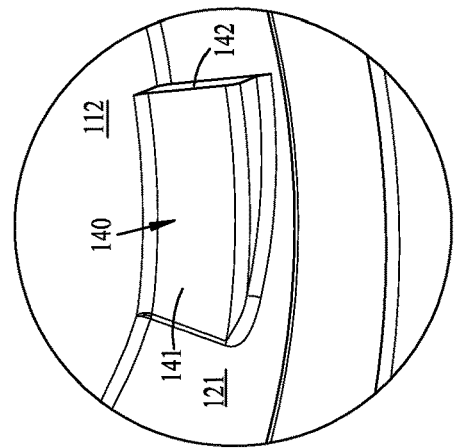
FIGS. 6B-6D are enlarged views of the details shown in FIG. 6A.
Figure 6B:
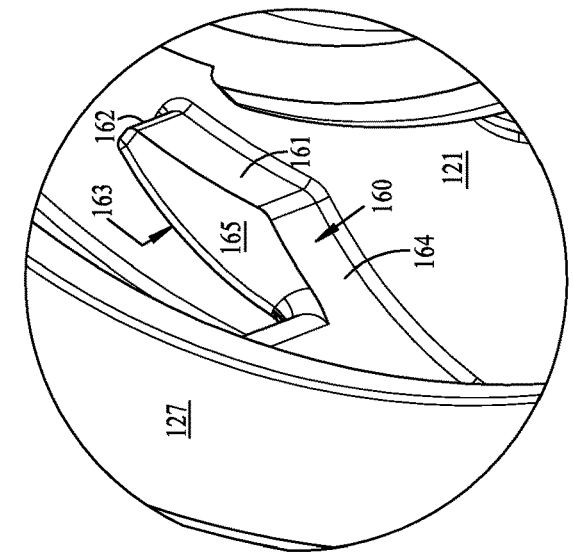
Figure 6C:
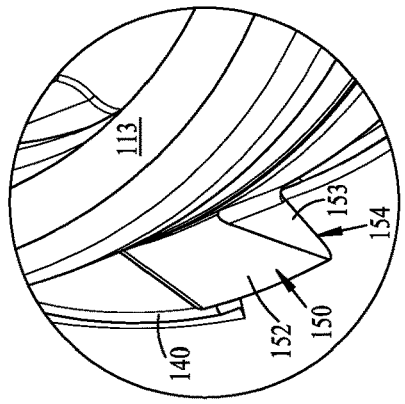
Figure 6A:
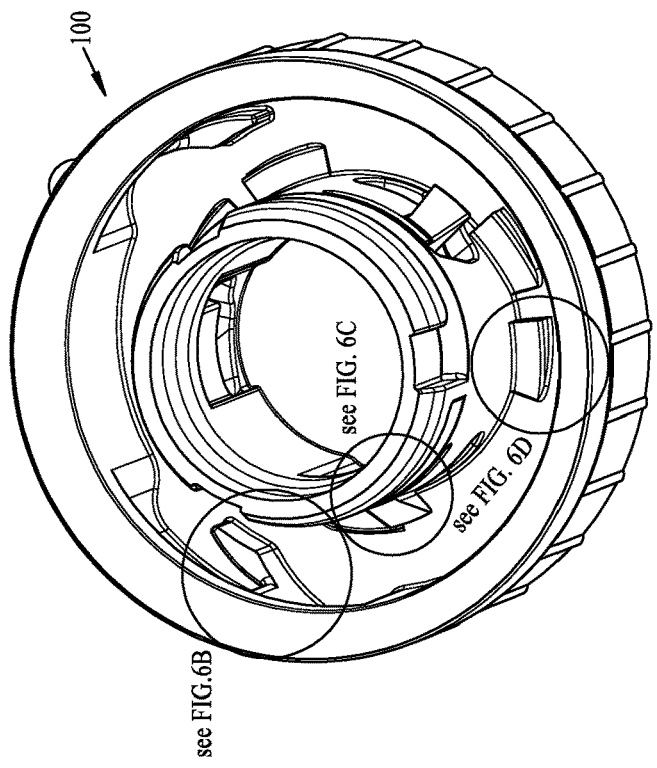
FIG. 6A is an upper perspective view, that also shows the inside, of the outer part of the aggregate cap shown in FIG. 2.
Figure 7B:
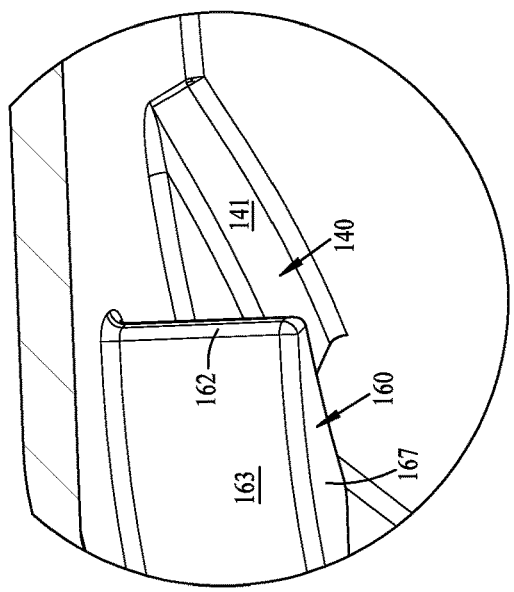
FIGS. 7B-7C are enlarged views of the details shown in FIG. 7A.
Figure 7C:
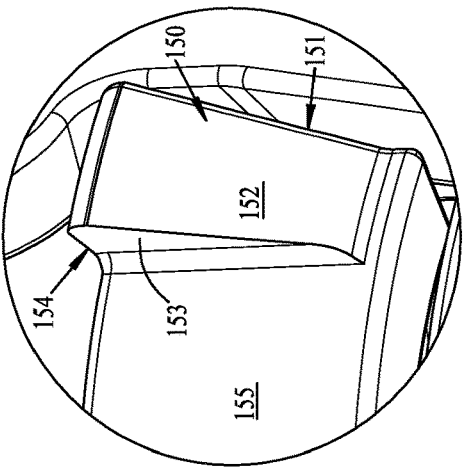
Figure 7A:
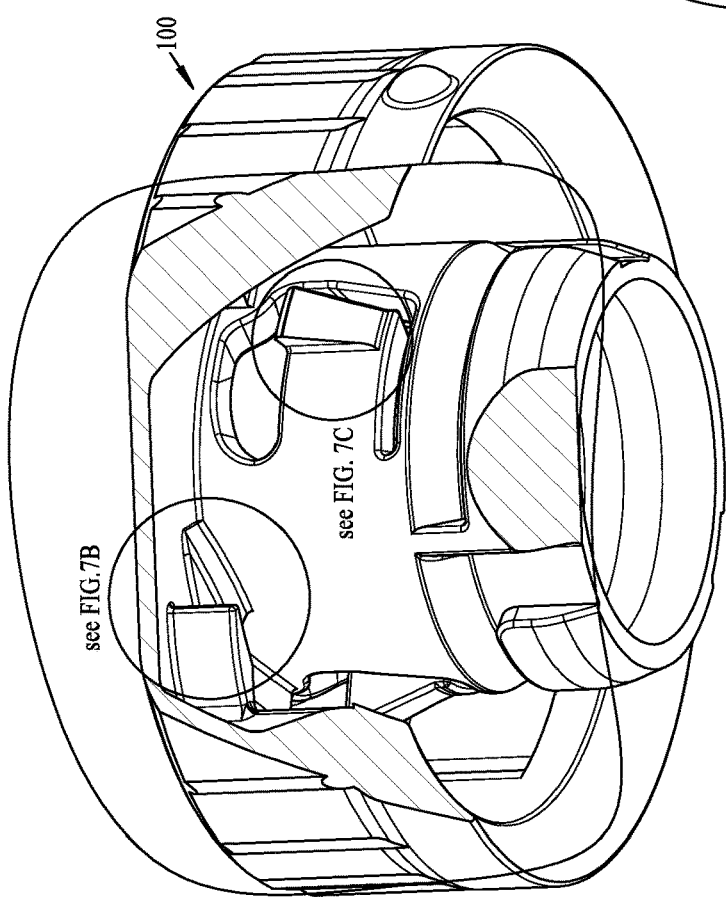
FIG. 7A is a lower perspective cutaway view of the outer part of the aggregate cap shown in FIG. 2.

The outer part 100 may consist of a circular solid disc with a smooth top surface 122 and a lower surface 121 on which may be centrally dispose an outer cylindrical flange 120 that straddles the periphery and an inner flange 110. The outer flange 120 may be solid with its smooth inner surface 123 punctuated by the recesses 124, 125 of a certain height from the lower face 121. Disposed on the lower face 121 and separating the recesses 124, 125, as shown in FIGS. 5D, 6B, may be a wedge 160 with a flat top 165 of certain height that juts inwards to a front end 162 disposed near the center of the recess 124. The wedge's inner surface 161, 164 may merge with the wall of the recess 125 whilst its outer wall 163 merges with the end wall 126 of the recess 124. A pair of four-sided cross-sectioned sloping wedges 140, spaced a certain distance apart, may also be disposed on the lower surface 121 whilst their inner curved surface may fuse with the outer surface 112 of the inner flange 110. The top face 141 of the wedge 140 may slope upwards from the lower surface 121 to the top of a vertical face 142 that is normal to the outer surface 112 of the flange 110, as shown in FIG. 6D. Apertures 114, 115, 116 on the inner flange 110 disposed a certain height from the lower surface 121 may form the boundaries of a flexible limb on whose free end may be disposed a four-sided cross-sectioned wedge 150 that protrudes from the outer surface 112 of the inner flange 110. The aperture 116 disposed adjacent to the free end of the limb may be shaped and be more spacious to allow for the unhindered displacement of the limb and wedge 150 transversely to the outer surface 112, whilst the bottom aperture 115 may be narrow to allow for only minimal vertical displacement of the limb. Both ends of the top 114 and bottom 115 apertures may be rounded to enhance flexibility of the limb 150. The curved sloping face 152 of the wedge disposed at the end of the limb 150 may slope outwards from the lower aperture 115 to end at a top horizontal face 154 on the top aperture 114. At the free end of the limb 150 may be a transverse vertical surface 151 that also comprises the wedge's far end. The other vertical surface 153 of the wedge 150, located nearer the limb attachment, may be oriented slightly away from the normal to make the arm 150 function like a hook structure. A chamfer 119 may be disposed at the outer edge of the top surface 113 at the free end of the inner flange 110. Also, equally spaced tracks 117 of certain depth, separated by small segments 118, may be disposed on the outer surface 112 of the inner flange 110. The track may consist of a rectangular cross-sectioned vertical indent component that opens at the free end 113 of the inner flange 110 and a long horizontal arc-notch component with a right-angled cross-section whose horizontal base may be disposed near the free end 113. The wall thickness of the inner flange increases as its inner surface 111 slopes gradually inwards from the edge of the top surface 113 to an otherwise smooth surface that is only punctuated by the apertures 114, 115, 116. Over the recesses 124, 125 the inner surface 123 may merge to a concave surface 127 that extends outwards to the rounded the top of the flange 120. The outer flange 120 may have a smooth top outermost surface 128 on which may be disposed a button protrusion 130 and a lower inwards offsetted surface 129 on which may be disposed equally spaced flutes 131 to enhance grip.

Figure 8:
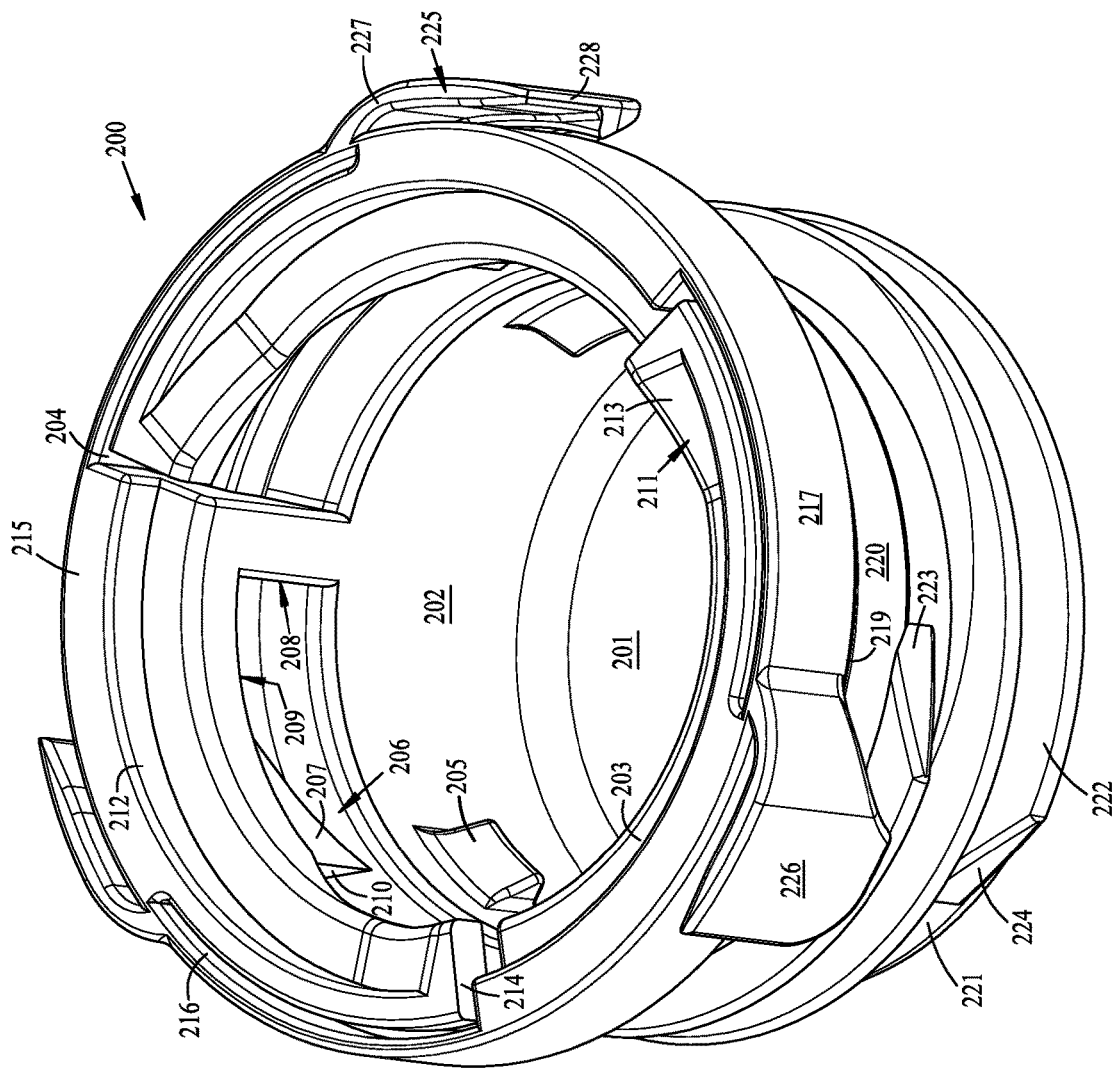
FIG. 8 is an upper perspective view, that also shows the inside, of the inner part of the aggregate cap shown in FIG. 2.
Figure 9:
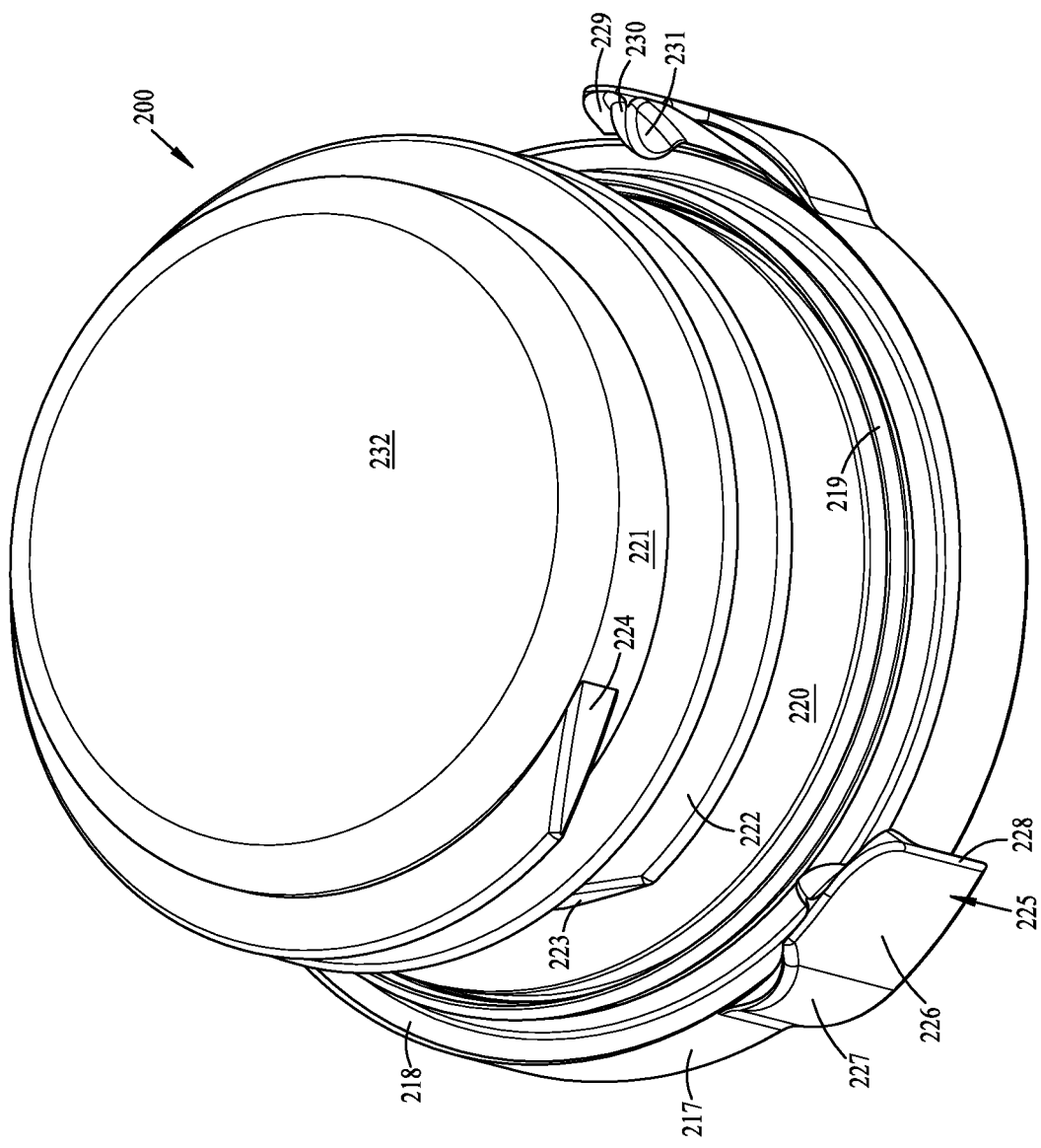
FIG. 9 is an upper perspective view showing the outer features of the inner part of the aggregate cap shown in FIG. 2.
Figure 11B:
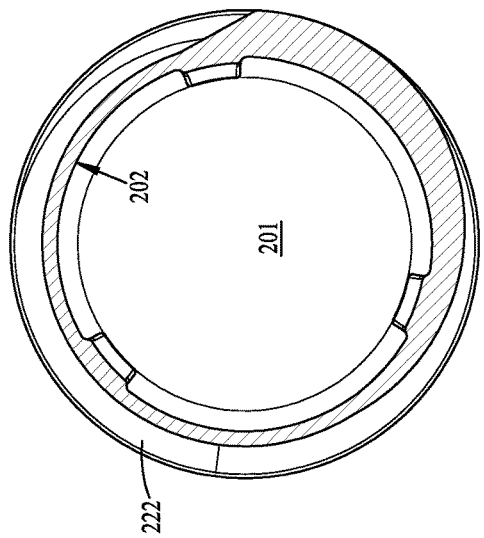
FIGS. 11B-11D are cross-sectional plan views along the lines 11B-11B, 11C-11C and 11D-11D, respectively, shown in FIG. 11A.
Figure 11D:
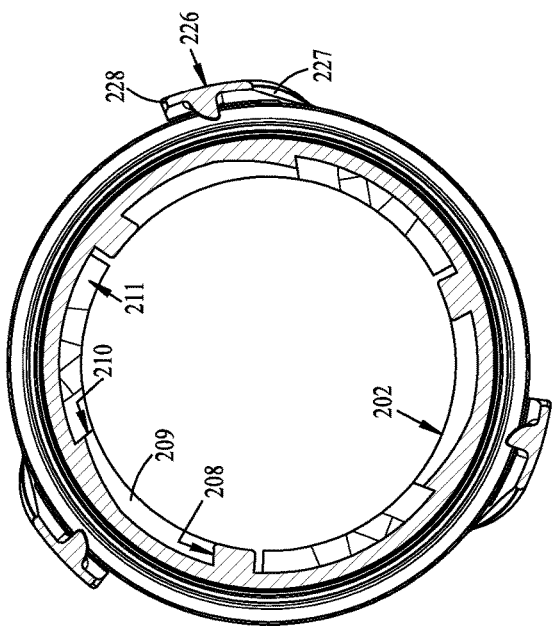
Figure 11A:
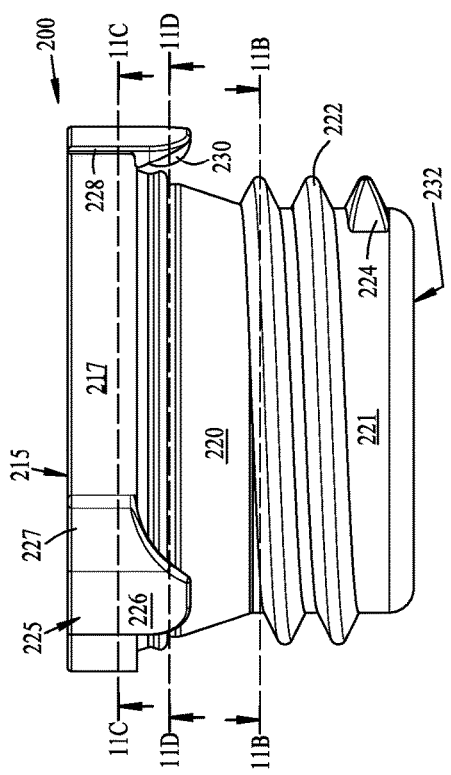
FIG. 11A is a side view of the inner part of the aggregate cap shown in FIG. 2.
Figure 11C:
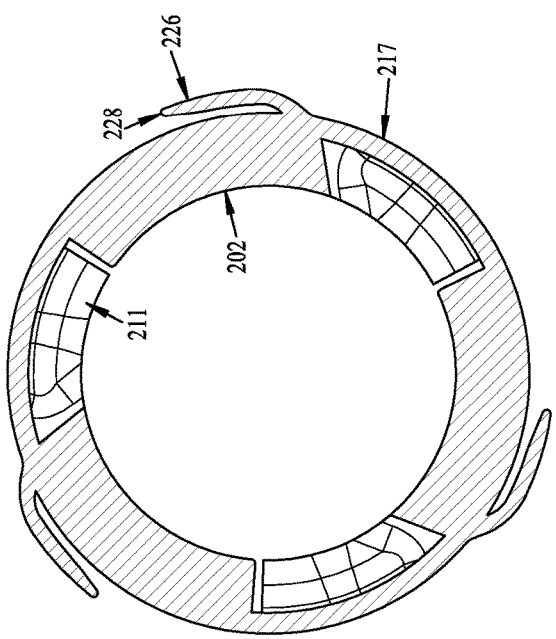

The inner part 200 of the aggregate cap 300, details of which are shown in FIGS. 8-11, may be in the shape of a cylindrical flange with a circular disc, that may be smooth on both sides 201, 232, disposed at its lower end. A thread 222 of triangular cross-section, with a rounded apex, may revolve approximately twice anticlockwise upwards, as shown in FIG. 8, around the vertical lower outer surface 221 of the cylindrical flange. The ends 223, 224 of the thread 222 may be sloped to merge with the outer surface 221 and its top 223 part may merge, as shown in FIG. 11B, with the outwards sloping surface 220 of the cylinder that may, in turn, slope slightly inwards at its top to end at the underside of an overhanging cross-section of the cylinder that may comprise a thin flap 219 as shown in the details of FIGS. 10C-D. The outer surface of the flap 219 continues sloping outwards and merges to the rounded ceiling surface 218. They may together match the shape of the surface of the lip 403 of the finish 400 and its top surfaces 404, 405 such that, when in contact with each other, they may form a tight sealing. As shown in FIG. 8, concentric thin flaps 225 may attach at one end 227 to the outer surface 217 of the overhang and freely span clockwise to a thinner pointed end 228. The attachment 227, on the whole depth of the outer surface 217, may be flared and rounded for greater strength and flexibility. At the bottom of the inner surface 229 of the flap 225, that slopes outwards to match the concave surface 405 of the finish 400, may be disposed a protrusion 230 that may be shaped to fit into the recess 414 of the finish 400 so that its front surface 231 may then interact with the surface 415 of the recess 414. Wedge protrusions 205, with a triangular cross-section and a horizontal lower base, that may loosely fit into both the vertical and horizontal parts of the tracks 117 on the outer cap part 100 may be disposed a distance from bottom of the inner surface 202 of the cylindrical flange. Equally spaced recesses 206 that are separated by small segments may be disposed a distance over the protrusions 205. As shown in FIG. 8, the lower part of a recess 206 may slope up outwards, like the outer face 220 of the cylinder, from the inner face 202 to an inner vertical face. On the right, the recess 206 may start at a vertical face 208 that is slanted to the right from the normal and span anticlockwise to another edge face 210 that may likewise be slanted. The horizontal roof 209 on this side of the recess 206 may be disposed just below the horizontal top surface 203 of the cylinder flange that is adjacent to the vertical inner surface 212 of the cylinder overhang. The edge face 210 may be the end of a protrusion 207 that gradually slopes inwards midway from the start of the recess 206 and may also be the edge of the support or anchor of an arc-cantilever 211 formed by the recess 206 and its extension to the top surface 215 of the overhang. The extension to the top surface 215 may be made by an arc aperture 216 disposed beyond the inner surface 212 and a rectangular cross-sectioned transverse aperture 204 that may give room for the free end 214, with a vertical surface on a normal plane, to move unhindered in a vertical direction. The top 213 of the arc-cantilever 211 may be composed of two surfaces; a narrow horizontal outer planar part that coincides with the top surface 215 of the cylinder overhang and a concentric inner surface 213 that slopes downwards a short distance from the free end 214 to a long trailing horizontal surface. On the front of the anchor surface 210, as FIGS. 10B,10D shows, the recess 206 may further extend outwards and merge with the aperture 216; it may also slope upwards circumferentially under the free end of the arc-cantilever 211 to create space that may enable its downward displacement.

Figure 15B:
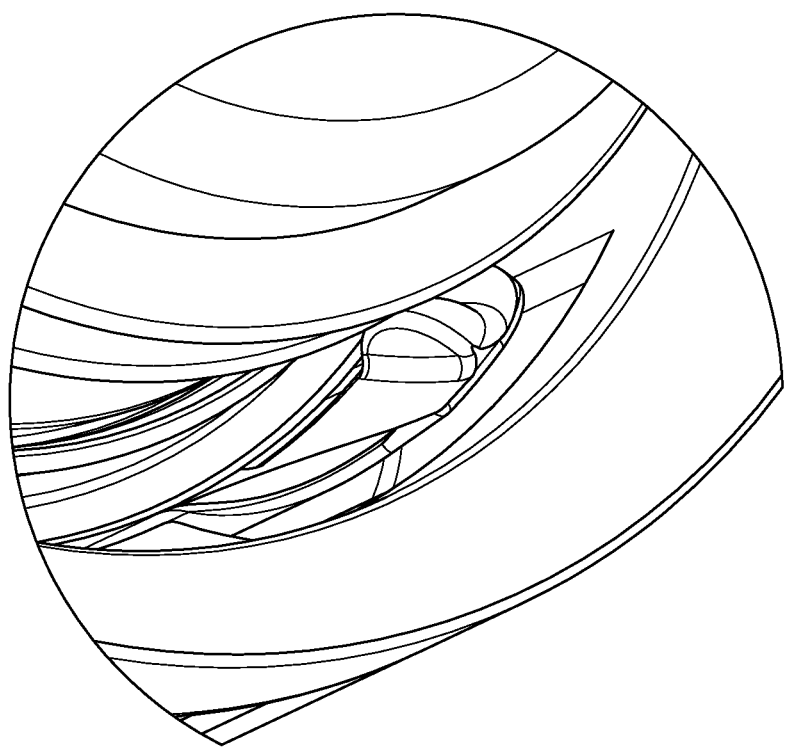
FIG. 15B is an enlarged view of the detail shown in FIG. 15A.
Figure 15A:
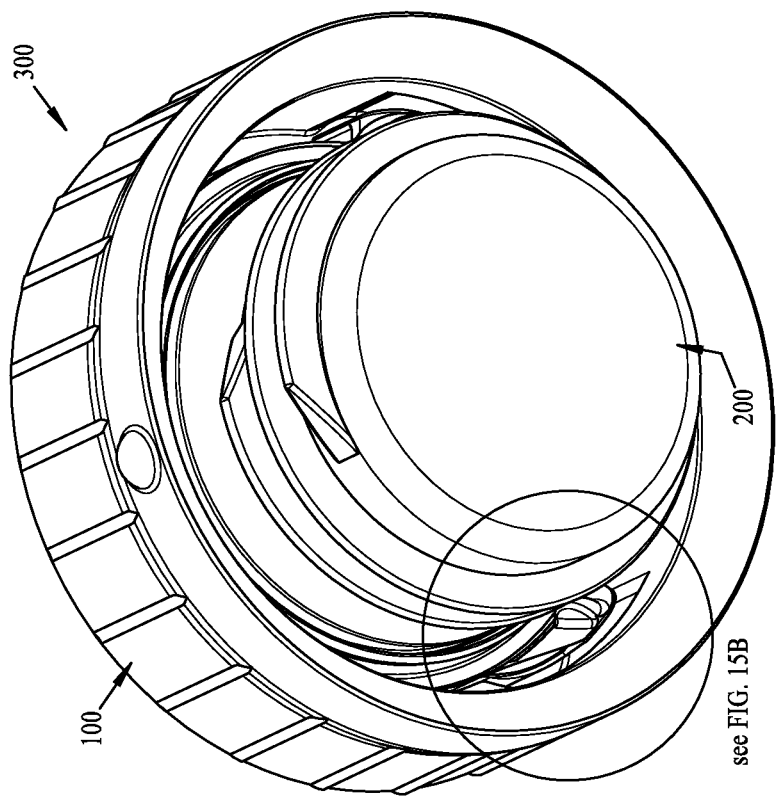
FIG. 15A is a lower perspective view showing the aggregate cap, as shown in FIG. 1.
Figure 16B:
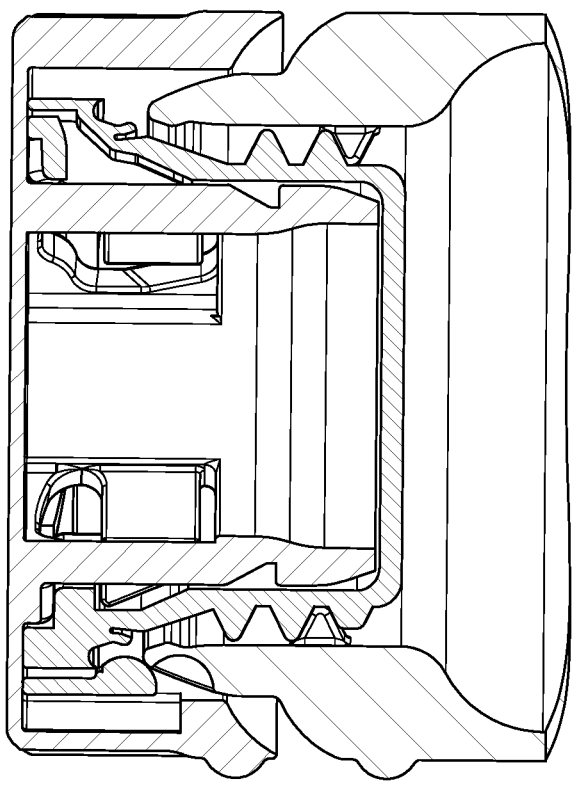
FIG. 16B is a cross-sectional plan view along the line 16B-16B shown in FIG. 16A.
Figure 16A:
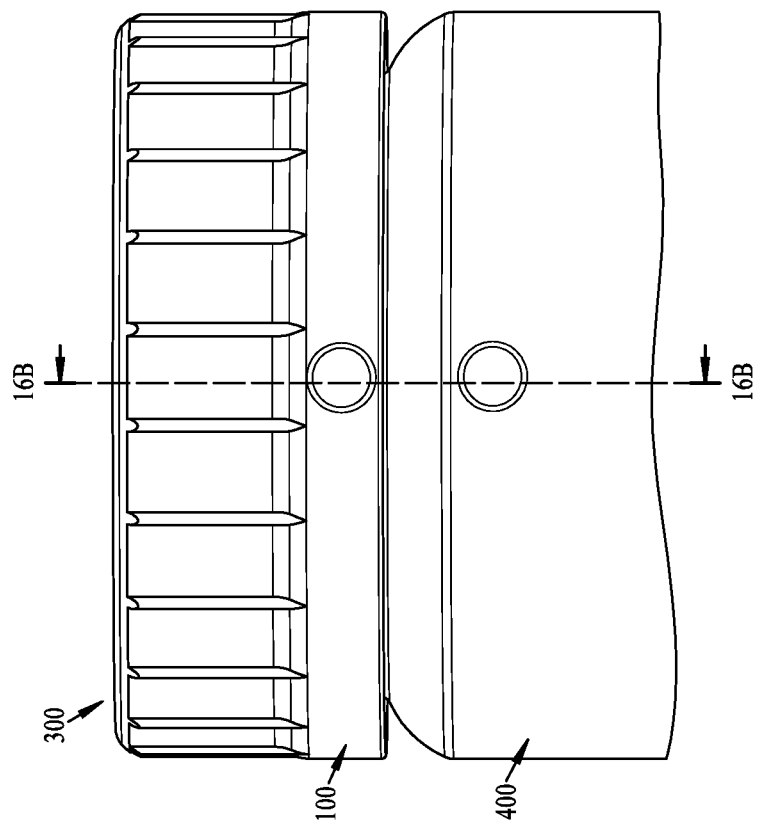
FIG. 16A is a side view showing the aggregate cap, shown in FIG. 15A, partially inserted into the neck finish, shown in FIG. 12.
Figure 17B:
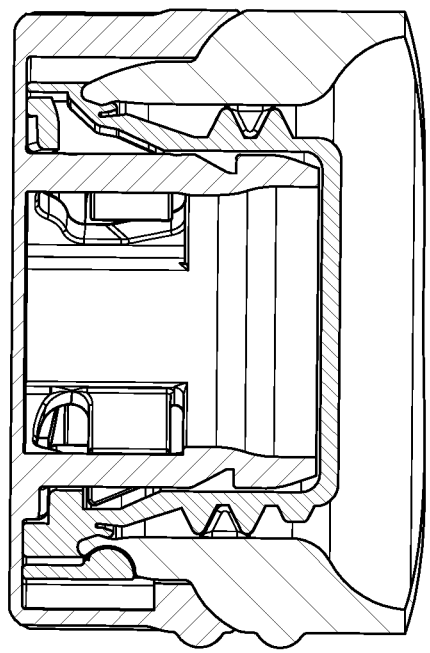
FIG. 17B is a cross-sectional plan view along the line 17B-17B shown in FIG. 17A.
Figure 18A:
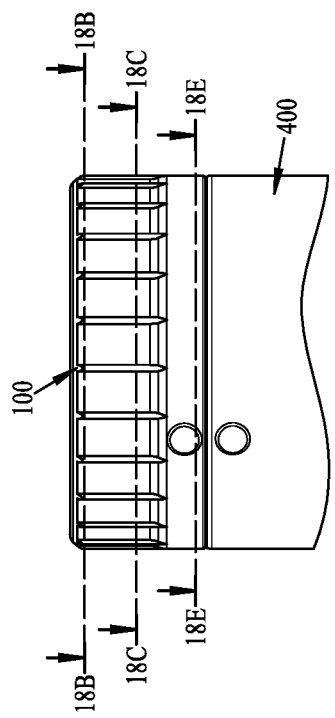
FIG. 18A is a side view of the unopened neck finish and aggregate cap, as also shown in FIG. 1, i.e., in a locked configuration.
Figure 18C:
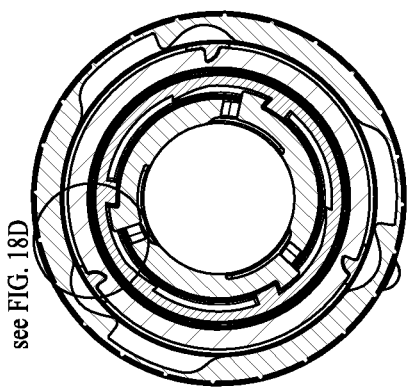
FIGS. 18B-C and FIG. 18E are cross-sectional plan views along the lines 18B-18B, 18C-18C and 18E-18E shown in FIG. 18A, respectively.
Figure 18B:
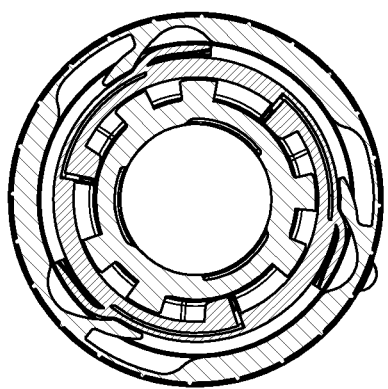
Figure 18F:
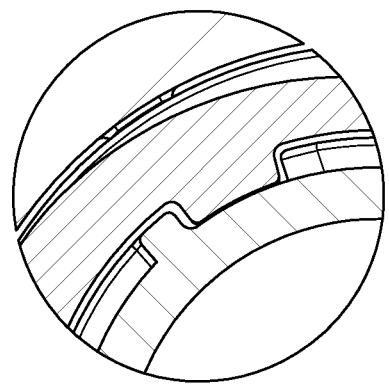
FIG. 18D and FIG. 18F are enlarged views of the details shown in FIG. 18C and FIG. 18E, respectively.
Figure 18E:
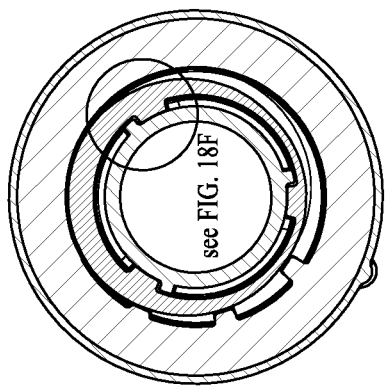
Figure 18D:
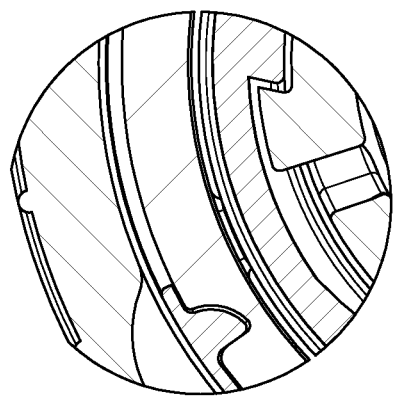

The aggregate cap 300 may be assembled by placing one of the parts on a flat surface and pushing the other into it whilst the button marker 130 and the vertical tracks 117 on the outer cap 100 are aligned, respectively, with the lower end 224 of the thread 222 and the protrusions 205 on the inner cap 200, as in the case shown in FIGS. 14A-C in which the outer part 100 is pushed into the inner part 200. During the placement, the protrusions 205 on the inner cap 200 may move along the vertical part of the tracks 117 on the outer cap 100 and the flexible limbs 150 with their outer sloping faces 152 may press against the rounded edge of the surface 203 on the inside of the inner cap 200 resulting in them being displaced inwards before they eventually snap out into the recesses 206. In the assembled aggregate cap 300, shown in FIG. 15A, the interaction between the recess wall 208 and protrusions 205 on the inner cap 200 and the wedge 150 and end wall of the track 117 on the outer cap 100, respectively, may constrain the outer cap 100 to only rotate in an anticlockwise direction relative to the inner cap 200. FIGS. 15A-B also show the flaps 225 of the inner cap 200 now disposed adjacent to the recesses 125 that may provide space for them to be displaced outwards whilst the aggregate cap 300 is being first-time screwed on to the neck finish 400, as shown in FIG. 16B. Also, during the screwing into place, the underside of the protrusions 230 of the flaps 225 of the inner cap 200 may first interact with the sloping surface 405 at the top of the neck finish 400. With further screw rotation, the free end of the flap 225 may be displaced outwards with the protrusion 230 sliding unhindered on the sloping surface 405 whilst also traversing the recesses 414 and eventually being lodged into them, as FIG. 18D shows, so that the interaction between the vertical surfaces 231, 415 on the protrusion 230 and the recess 414, respectively, may constrain the unscrewing of the inner cap 200 from the neck finish 400. Also, whilst being screwed into the neck finish 400, the annular flap 219 of the inner cap 200 will interact with the inner surface 403 and be displaced inwards on its way to be snapped to the recess 402 to enhance the tight sealing of the whole surface below the lip 404 as shown in FIG. 17B. Screwing and unscrewing forces must be exerted for the flap 219 to be snapped into or extracted from the recess 402.

Figure 17A:
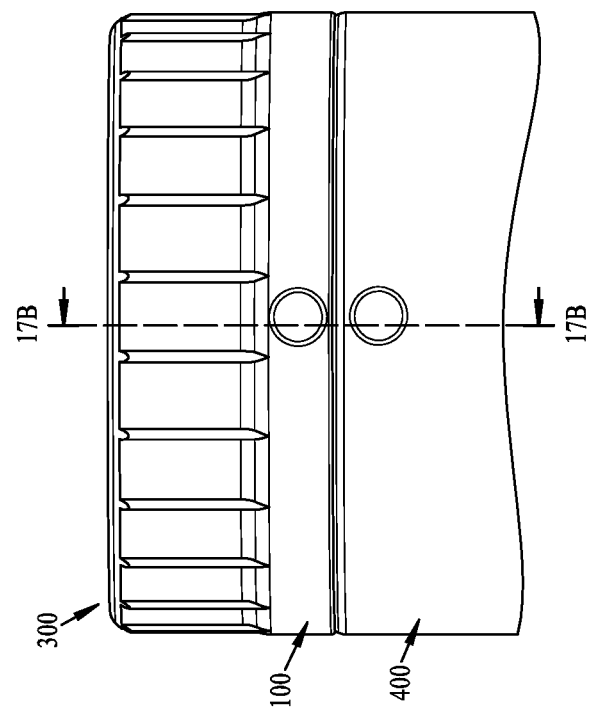
FIG. 17A is a side view showing the aggregate cap fully in place in the finish in the locked unopened configuration, as also shown in FIG. 1.

With the cap 300 screwed into the neck finish 400, as shown in FIGS. 17A-B, into a locked configuration, any possible relative displacement between them may lead to the evident opening of the bottle. Also, the inner cap 200 may now be inaccessible and only a force, an unscrewing anticlockwise rotation, exerted on the outer cap 100 may affect its sealed attachment to the neck finish 400. Relative vertical displacement between the cap parts 100, 200 may be minimal, as shown in FIG. 17B, because the top surface 215 of the inner cap 200 may be in contact with the underside 121 of the roof disc of the outer cap 100 whilst the small depth of the lower aperture 115 adjacent to the limb 150 may only cater for its minimal displacement. Also, in this locked configuration, further screw tightening may be difficult to achieve because the rounded ceiling surface 218 of the inner cap 200 may now be pressing against the lip 404 of the neck finish 400. But even if it occurs with only a slight rotation, coupling between the parts of the cap 300 may be maintained through interaction between the then displaced flaps 225 and the combined faces 161, 164 of the wedge 160 and the recesses 125 to ensure that any subsequent unscrewing force on the outer cap 100 will first drag the inner cap 100 back to the locked configuration again, with the protrusions 230 again lodged in the recesses 414. Also, the interaction between the curved faces 127, 407 on the outer cap 100 and the neck finish 400, respectively, may also provide constraint against additional screw tightening of the aggregate cap 300 in the locked configuration and further act as anti-prizing to prevent any tampering attempts that access to the flaps 225 of the inner cap 200 might facilitate.

Figure 19C:
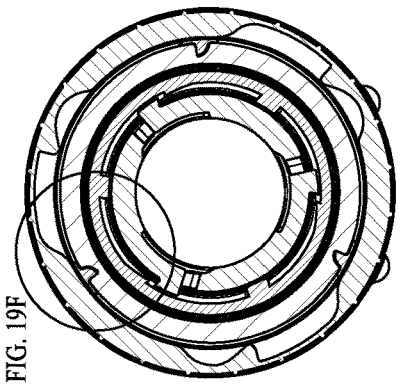
FIGS. 19B-19D are cross-sectional plan views along the lines 19B-19B, 19C-19C and 19D-19D shown in FIG. 19A, respectively.
Figure 19F:
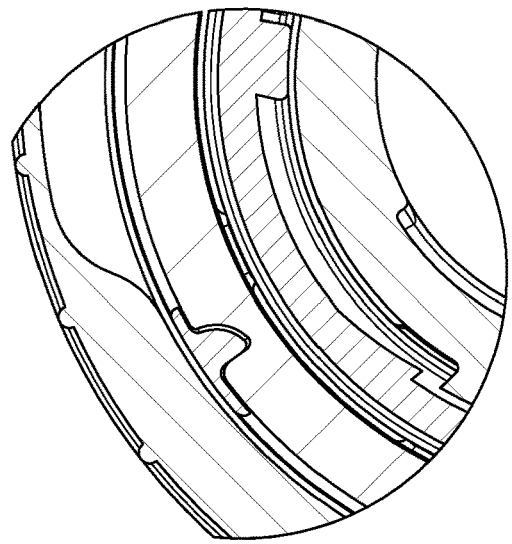
FIGS. 19E-19F are enlarged views of the details shown in FIGS. 19B-19C, respectively.
Figure 19B:
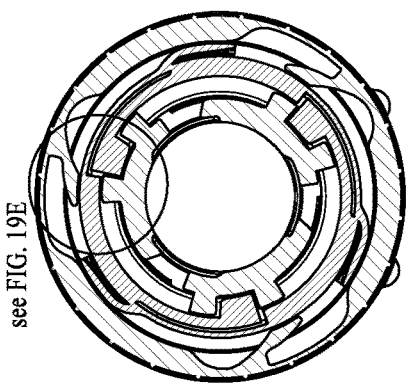
Figure 19E:
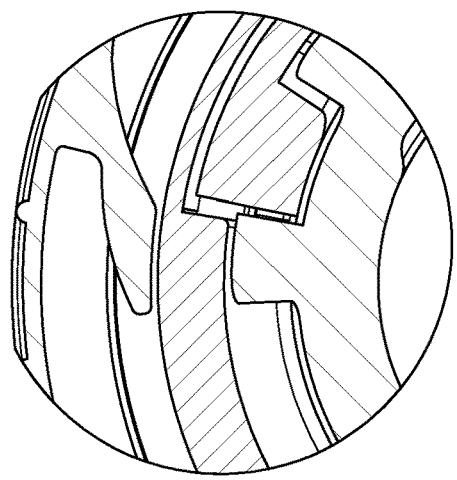
Figure 19A:
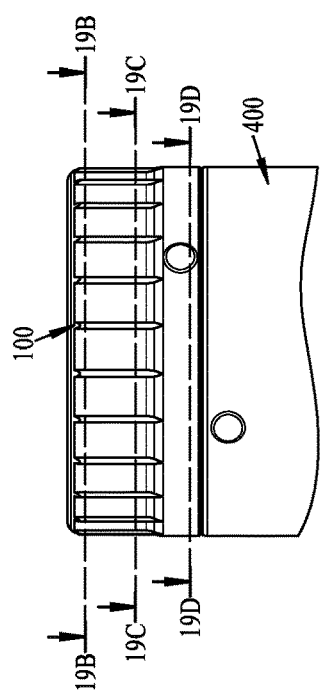
FIG. 19A is a side view of the neck finish and aggregate cap in a locked configuration whilst the bottle is being opened.
Figure 19D:
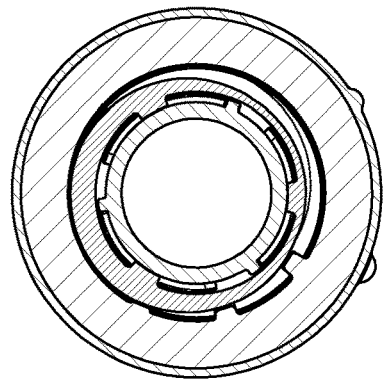

Upon the exertion of an anticlockwise rotational force, only the outer cap 100 may first rotate relative to the inner cap 200 to the intermediate configuration shown in FIG. 19A, in which the inner cap 200 is still locked to the neck finish 400 and from which a clockwise rotation of the outer cap 100 may be difficult and not realign the exposed button protrusions 130, 409 on the outer surfaces of the outer cap 100 and the neck finish 400. This new constraint may come about because, as FIG. 19B shows, the first of the pairs of sloping wedges 140 on the roof surface 121 of the outer cap 100 may have displaced downwards and then traversed the free end of the flexible arc-cantilever 211 that then snaps up. The faces 142, 214 are now adjacent and relative clockwise rotation may be difficult and occurs in the improbable situation of the arc-cantilever 211, now pressed against the aperture 204 wall, buckling. Rotation to this configuration may also cause the protrusions on the flexible limbs 150, lodged inside the recesses 206, to first slide, with minimal resistance, on the recesses' inner wall and then, with some resistance, on its inwards sloping protrusions 207 to eventually traverse the end edge surface 210. A clockwise rotation of the outer cap 100, relative to the inner cap 200, may whence be prevented because the face 153 of the limb protrusion 150 may press against the edge surface 210 as FIG. 19C shows. Traversing the protrusions 207 may be the only constraint against anticlockwise rotation of the outer cap 100 from the locked configuration and, thus, the shape of the inwards sloping surface of the protrusion 207 may determine the magnitude of the initial intentional rotational force that must be exerted to start opening the bottle. Also, as FIG. 19D shows, rotation to this intermediate configuration involves the protrusions 205 moving along the horizontal parts of the tracks 117 of the outer cap 100 effecting the gradual transfer of relative vertical constraint between the cap parts from that rendered by the protrusions 150 lodged in the recesses 206 in the initial locked configuration. Also shown in FIGS. 19B-C, are the protrusions 230 of the flaps 225 still lodged in the recesses 414 whilst the end of the wall 123, adjacent to the recess 124, still render minimum space for outward displacement to dislodge them. Meanwhile, the pointed edge 162 of the roof protrusions 160 are now unhindered, upon further rotation of the outer cap 100, from displacing the ends 228 of the flaps 225 and start dislodging their protrusions 230 from the recesses 414.

Figure 20A:
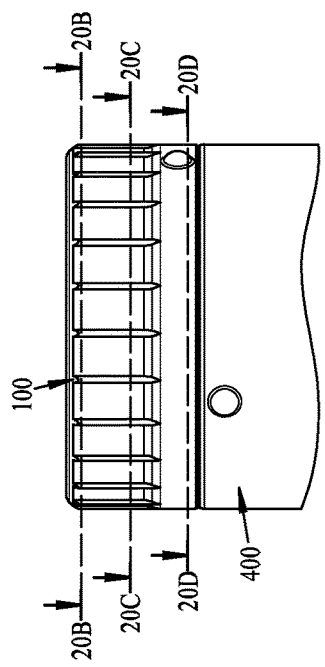
FIG. 20A is a side view of the neck finish and aggregate cap in an unlocked configuration whilst the bottle is being opened.
Figure 20B:
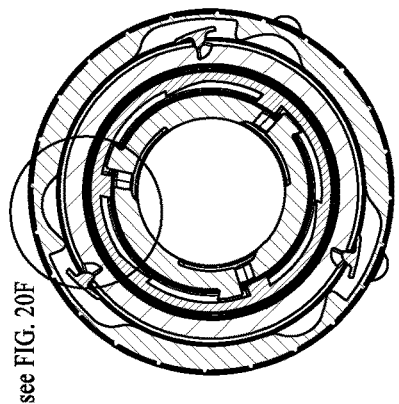
FIGS. 20B-D are cross-sectional plan views along the lines 20B-20B, 20C-20C and 20D-20D shown in FIG. 20A, respectively.
Figure 20E:
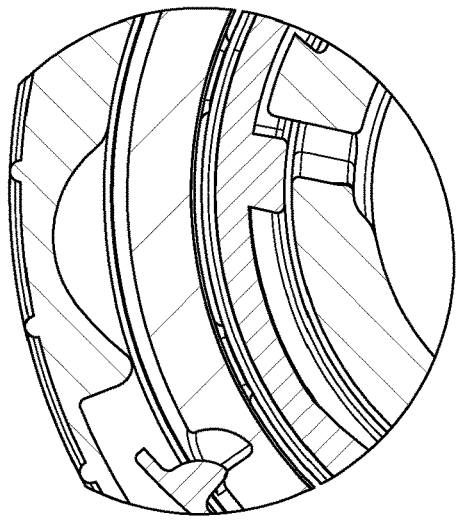
FIGS. 20E-20F are enlarged views of the details shown in FIGS. 20B-20C, respectively.
Figure 20C:
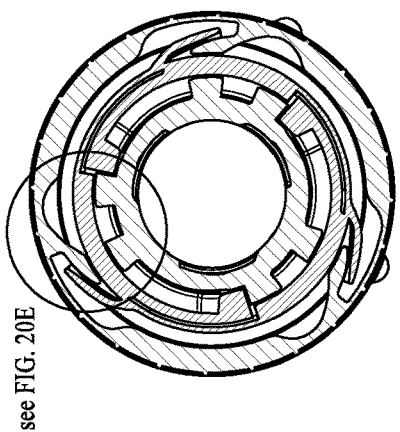
Figure 20F:
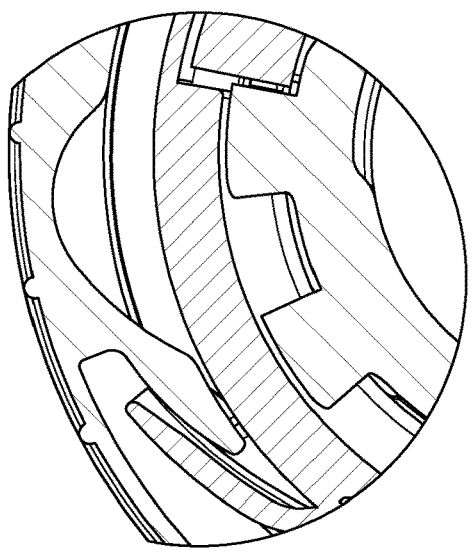
Figure 20D:
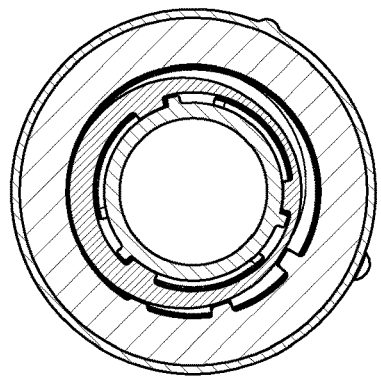

Further anticlockwise rotation exerted on the outer cap 100 may lead to it being rotated to the unlocked configuration shown in FIG. 20A in which it is permanently coupled, in all directions, to the inner cap 200 and all relative displacements between the cap parts is constrained. Meanwhile, the inner cap 200 may now be ready for unscrewing from the neck finish 400 with the only significant rotational constraint now being a component of the force required to extricate the flexible sealing flap 219 from the recess 402 under the lip 403 of the neck finish 400. Such a force may first overcome the minor constraint that is engendered whilst the flaps 225, and its protrusions 230, are being displaced outwards into the recesses 124, as shown in FIG. 20B, by the protrusions 160 on the roof of the outer cap 100. Another minor constraint to overcome first, may be the resistance to sliding of the second of the pairs of sloping wedges 140 on the top surface of the arc-cantilevers 211 before they eventually pass the end surfaces 214, as shown in FIG. 20B, and whence, as described for the intermediate configuration, clockwise rotation of the outer cap 100 relative to the inner cap 200 may not be possible. Also, in this unlocked configuration, the protrusions 205 may now be located at the end of the horizontal tracks 117 as FIG. 20D shows and the cap parts 100, 200 are now coupled in all directions with the visible button protrusions 130, 409 on the outer surfaces of the outer cap 100 and neck finish 400 further apart. The now fully coupled aggregate cap 300 may be unscrewed from the bottle and be reused with bottles with identical neck finishes to the one described herein. The alignment button protrusions 130, 409, or suitable markings, may then not align and determination as to whether the bottle has been previously opened may easily be done. The extent of misalignment may depend on the degree of tightening of the cap 300 and interaction between the sloping surfaces 127, 405 of the outer cap 100 and the neck finish 400, respectively.

The locked configuration, shown in FIGS. 17A-18F, may define the positioning of the non-repeating features of the inventions relative to both each other and to the repeating ones. Contemporary mass-scale manufacturing processes of the cap parts may involve specialized molding techniques. Still, bottles with the invented neck finish of lip diameters 24 mm and 30 mm and matching aggregate caps that tightly seal them as described hereinabove were made of PET material using 3-D FDM printing technology and found to function satisfactorily.

Those skilled in the art will observe that the inner cap embodiments of the invention may advantageously be coated with suitable liners that may form tighter sealings when interacting with neck finishes of bottles made of different materials. Although the inventions have been shown and described with respect to certain preferred embodiments, other embodiments, comprising of varying sizes and shapes, apparent to those of ordinary skill in the art, are also within the scope of the inventions.

Having thus described the inventions, what is claimed is:

1. An assembly of a bottle neck finish capped by an aggregate reusable cap comprising:
   a bottle neck finish having,
      a top round lip with a cross-section that transitions inwards down into a bulge and then a curved recess to ease the flow of content and to act as a tight boundary when interacting with the constricting surface of a cap;
   thread lugs disposed at equal intervals a distance below the lip on the inner vertical surface of said finish that may constitute a clockwise downwards winding female thread that allows for the easy flow of content;
   equally space quadrant-sphere indentations disposed inferiorly to the lip on the outwards sloping outer surface of said finish;
   a jutting spherical-shaped protrusion marker on its outer surface at the top of the neck and disposed aligned with one of the said indentations that is nearest the top thread lug on the inner surface of the neck;
   an aggregate reusable bottle cap that can tightly cap said neck finish in a manner that incorporates tamper evident functionality and that comprises of:
      an inner cap of cylindrical form closed at its bottom end with a male thread on its lower outer surface that may directly interact with said neck finish, said inner cap including equally spaced flaps extending from its top on the outermost surface, said inner cap including a thin circumferential flap disposed under an overhang cross-section at its top, said inner cap including flexible arc-cantilevers that partially form its top opening, said inner cap including equally spaced recesses disposed under the said flexible limbs, said inner cap including equally spaced wedge protrusions disposed on its inner vertical face below the said recesses;
      an outer cap composed of an inner and an outer cylindrical flange disposed on a flat circular top, said outer flange with outer surface comprising of equally spaced flutes and inferiorly to which a disposed spherical-shaped protrusion marker, said outer flange with a smooth inner surface that is punctuated by equally spaced recesses, wedges disposed on the undersurface of said circular top that extend from the recesses and point inwards to end at a small distance beyond the inner surface of said outer flange, equally spaced pairs of sloping wedges disposed on the underside of said circular top and on the outer connecting surface of said inner flange, equally spaced flexible arms with protruding wedges defined by apertures disposed near the top of said inner flange, equally spaced tracks defined by recesses on the outer face of said inner flange.

2. The assembly of claim 1 wherein the said inner and outer caps are inextricably coupled into an aggregate cap by inserting the outer cap through its inner flange into the inner cap, or vice versa, and pressing the two together.

3. The assembly of claim 1 wherein the said finish is tightly capped when said aggregate cap is clockwise screw rotated on it until the markers on it and said outer cap are aligned.

4. The assembly of claim 1 wherein to uncap said capped finish, said aggregate cap is rotated anticlockwise relative to said finish to a permanent configuration in which relative displacement between said inner and outer cap is not possible and, upon recapping said finish with the unscrewed cap, evidence of previous opening or tampering is indicated by the markers on the said finish and said outer cap not aligning anymore.

5. The assembly of claim 1 wherein the outermost surface of said finish on which said marker is disposed may be horizontal or sloping down from said finish.

\* \* \* \* \*